(12) United States Patent
Inoue et al.

(10) Patent No.: US 8,411,294 B2
(45) Date of Patent: Apr. 2, 2013

(54) IMAGE FORMING APPARATUS, IMAGE FORMING SYSTEM, AND INFORMATION PROCESSING APPARATUS

(75) Inventors: Takashi Inoue, Tokyo (JP); Ken Miura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1296 days.

(21) Appl. No.: 11/623,546

(22) Filed: Jan. 16, 2007

(65) Prior Publication Data

US 2007/0172281 A1    Jul. 26, 2007

(30) Foreign Application Priority Data

Jan. 17, 2006  (JP) ................... 2006-008893
Feb. 28, 2006  (JP) ................... 2006-052379

(51) Int. Cl.
*G06F 3/12* (2006.01)
(52) U.S. Cl. .............. 358/1.14; 358/1.13; 358/1.15
(58) Field of Classification Search ............ 358/1.13, 358/1.14, 1.15
See application file for complete search history.

(56) References Cited

U.S. PATENT DOCUMENTS

| | | | |
|---|---|---|---|
| 2003/0182368 A1* | 9/2003 | Horiyama | 709/203 |
| 2003/0202199 A1* | 10/2003 | Carter et al. | 358/1.13 |
| 2004/0117655 A1* | 6/2004 | Someshwar | 713/201 |
| 2004/0125398 A1* | 7/2004 | Aiyama | 358/1.14 |
| 2004/0196491 A1* | 10/2004 | Uchino | 358/1.15 |
| 2005/0007618 A1* | 1/2005 | Thomason | 358/1.14 |
| 2005/0134905 A1* | 6/2005 | Horiyama | 358/1.15 |
| 2005/0275868 A1* | 12/2005 | Higashiura et al. | 358/1.14 |
| 2006/0001900 A1* | 1/2006 | Watanabe et al. | 358/1.14 |

FOREIGN PATENT DOCUMENTS

| | | |
|---|---|---|
| JP | 2002055576 A | 2/2002 |
| JP | 2004-345203 A | 12/2004 |
| JP | 2005-193560 A | 7/2005 |

* cited by examiner

*Primary Examiner* — Marivelisse Santiago Cordero
*Assistant Examiner* — Kent Yip
(74) *Attorney, Agent, or Firm* — Panitch Schwarze Belisario & Nadel LLP

(57) ABSTRACT

An image forming system or the like may be installed at a public location such as a computer center of university to serve people who want to print for various purposes. Restrictions may be placed on the use of the system. Restriction on the use of the system may be lifted temporarily depending on the circumstances. For example, when a user is desperate to print a document despite the fact that the user is under restriction, the restriction may be lifted temporarily with some conditions. A printing system includes a cancellation requesting section and a printing section. The cancellation requesting section issues a request for cancellation of a print restriction placed on a user. The printing section cancels the print restriction in response to the request.

14 Claims, 26 Drawing Sheets

FIG.2

PRINT RESTRICTION INFORMATION

| USER NAME | PRINT RESTRICTION ON COLOR PRINTING |
|---|---|
| SMITH | ON |
| LINCOLN | OFF |

FIG.3

STRUCTURE OF PRINT DATA

| USER NAME | SMITH |
|---|---|
| OPERATION MODE | TEMPORARY PERMIT MODE |
| IMAGE FORMING DATA | COLOR DATA |

FIG.4

OPERATION MODE

○ NORMAL MODE

☑ TEMPORARY PERMIT MODE

PRINT RESTRICTION INFORMATION

| USER NAME | PRINT RESTRICTION ON COLOR PRINTING | PRINT PERMIT CONDITION (REMAINING NUMBER OF PRINT PERMITS) |
|---|---|---|
| SMITH | ON | 10 |
| LINCOLN | OFF | 10 |

FIG.11

PRINT RESTRICTION INFORMATION

| USER NAME | PRINT RESTRICTION ON COLOR PRINTING | PRINT PERMIT CONDITION | |
|---|---|---|---|
| | | REMAINING NUMBER OF PRINT PERMITS | DOCUMENT TITLE |
| SMITH | ON | 10 | ACCOUNTING DATA.doc |
| LINCOLN | OFF | 10 | |

FIG.12

STRUCTURE OF PRINT DATA

| USER INFORMATION | SMITH |
|---|---|
| OPERATION MODE | TEMPORARY PERMIT MODE |
| DOCUMENT TITLE | ACCOUNTING DATA.doc |
| IMAGE FORMING DATA | COLOR DATA |

FIG.16

PRINT RESTRICTION INFORMATION

| USER NAME | PRINT RESTRICTION ON COLOR PRINTING | PRINT PERMIT CONDITION ||
|---|---|---|---|
| | | AMOUNT OF TIME ALLOWED FOR PRINTING | DOCUMENT TITLE |
| SMITH | ON | 60 | |
| LINCOLN | OFF | | |

FIG.17

STRUCTURE OF PRINT DATA

| USER INFORMATION | SMITH |
|---|---|
| OPERATION MODE | TEMPORARY PERMIT MODE |
| TIME-OF-DAY OF PRINTING | 2005/10/04 9:00:00 |
| IMAGE FORMING DATA | COLOR DATA |

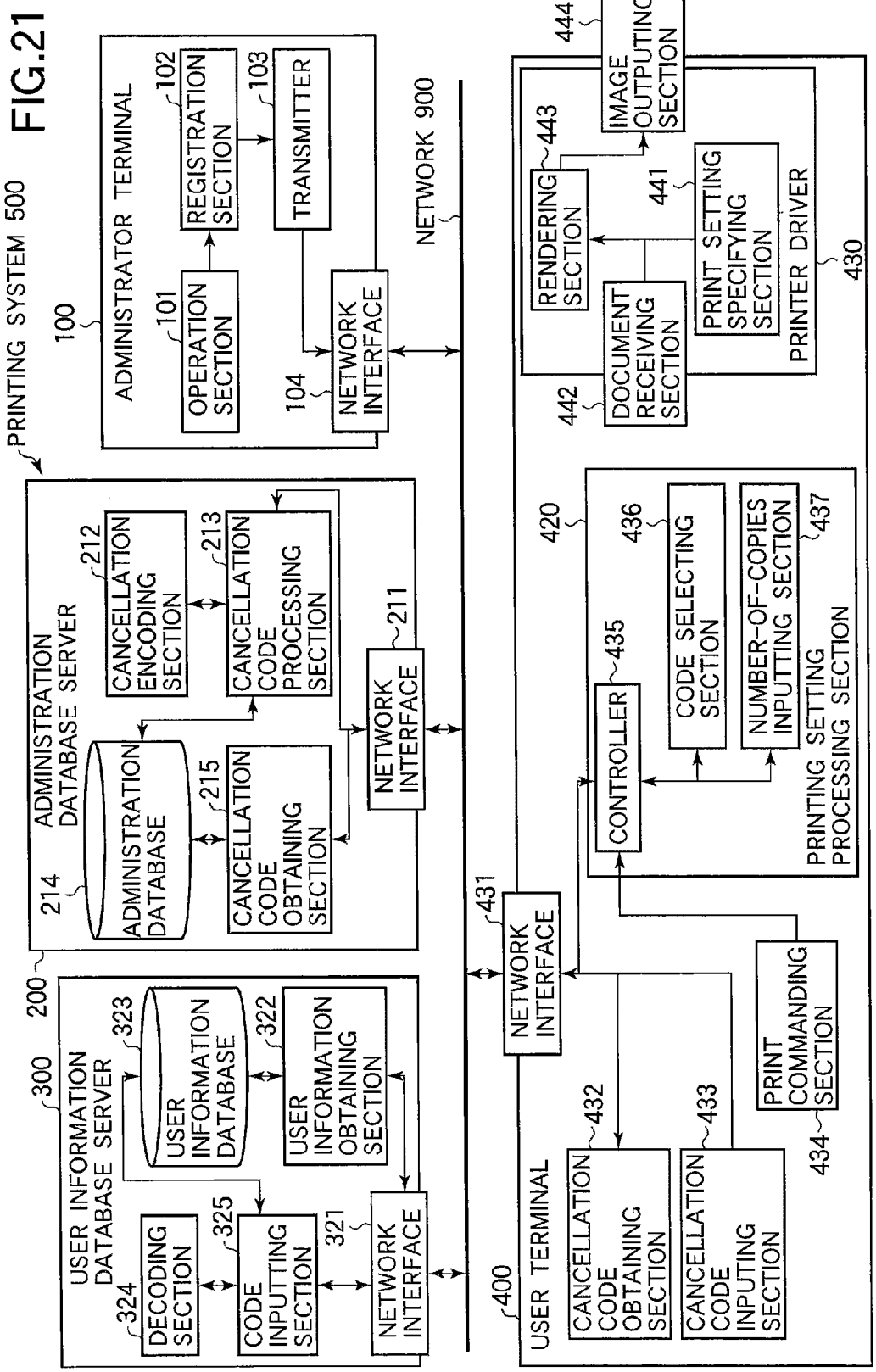

FIG.22A

- USER NAME
- GROUP NAME
- ATTRIBUTE OF DOCUMENT
- EXPIRATION DATE
- PRINT RESTRICTION LIST
- QUOTA ON PAGES TO PRINT FOR USER

FIG.22B

- CANCELLATION CODE
- USER NAME
- GROUP NAME

FIG.23

- USER NAME
- GROUP NAME
- PRINT RESTRICTION CODE LIST
- VALID CANCELLATION CODE LIST
  $\begin{pmatrix} \text{CANCELLATION CODE, PRINT RESTRICTION LIST,} \\ \text{ATTRIBUTE OF DOCUMENT, EXPIRATION DATA,} \\ \text{QUOTA ON PAGES FOR USER} \end{pmatrix}$
- INVALID CANCELLATION CODE LIST

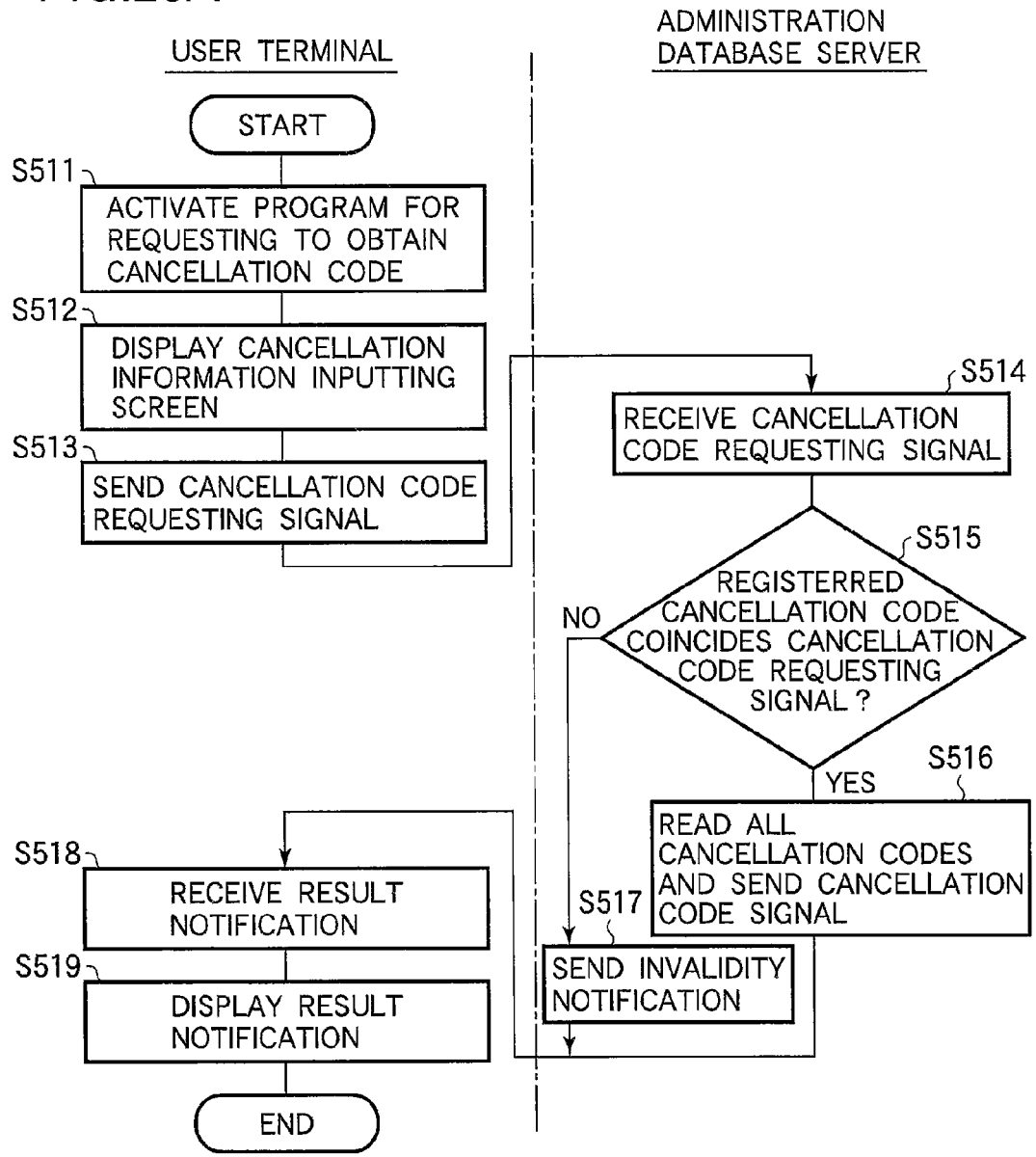

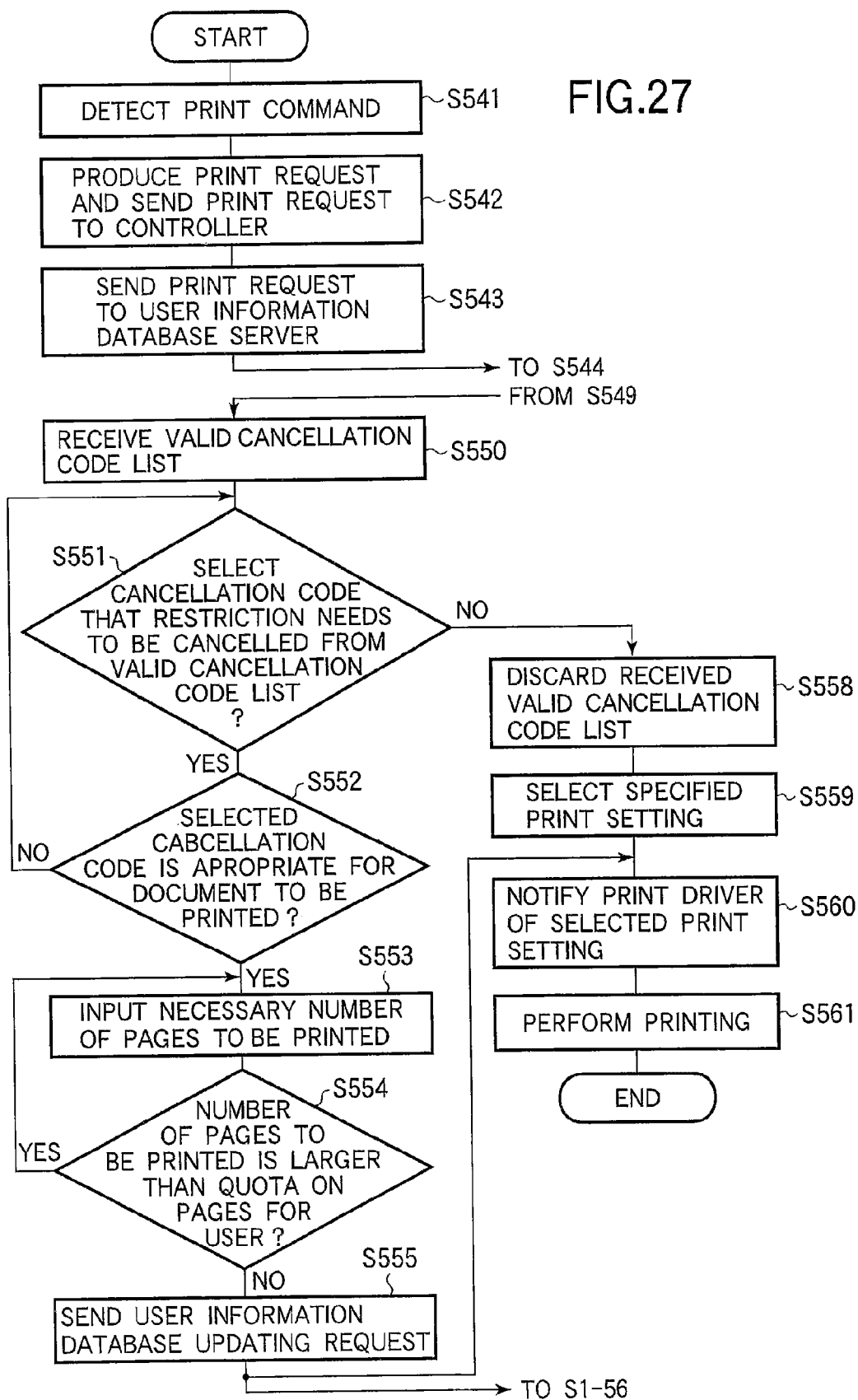

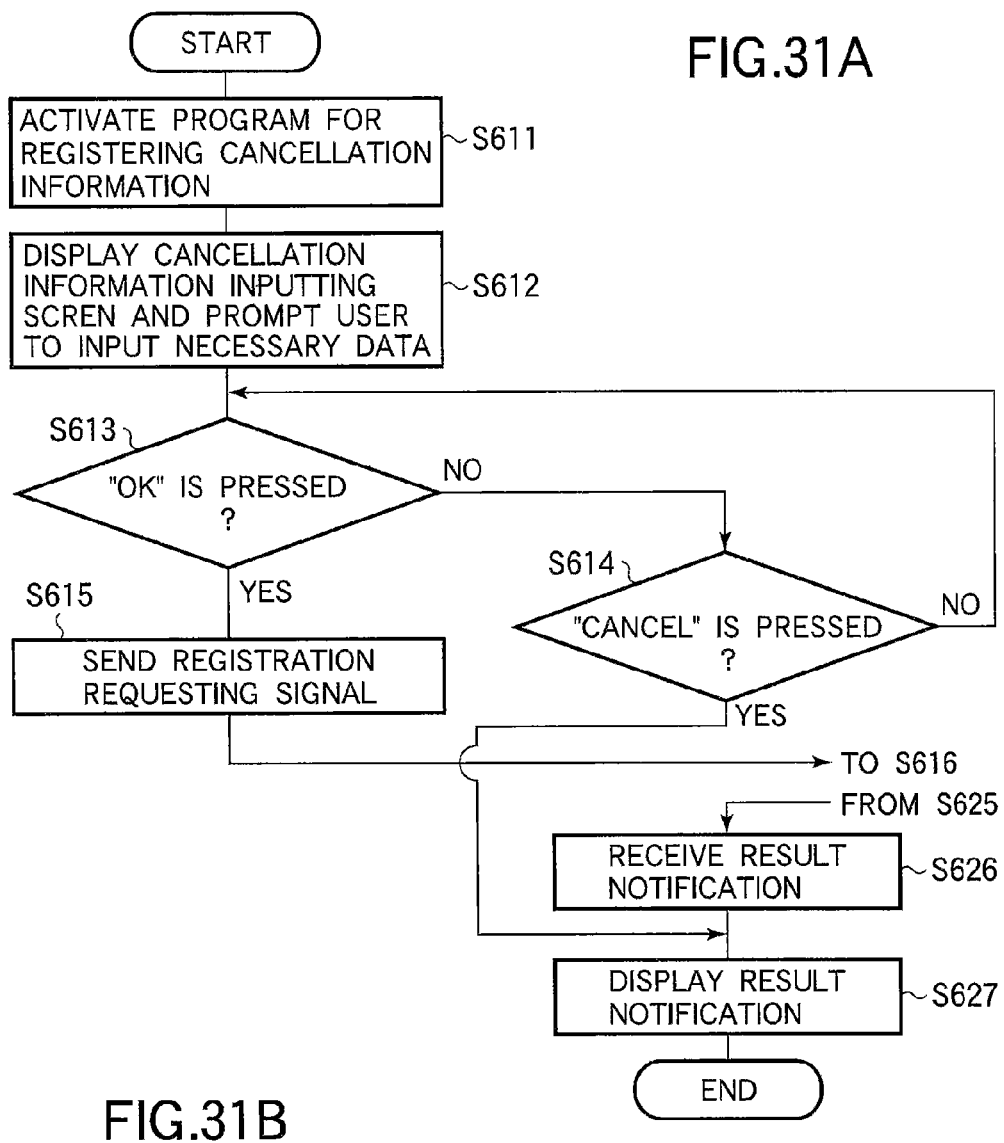

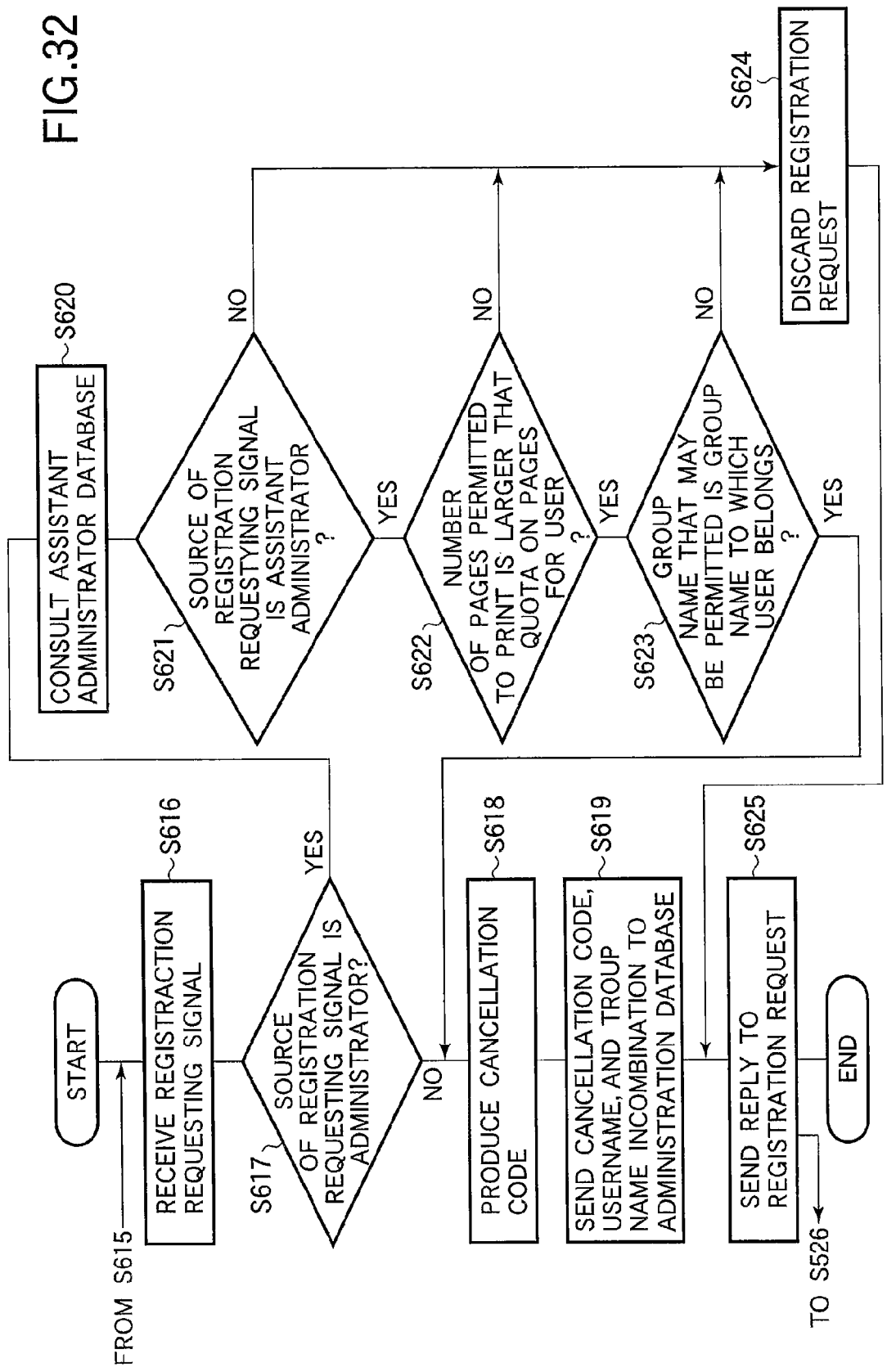

IMAGE FORMING APPARATUS, IMAGE FORMING SYSTEM, AND INFORMATION PROCESSING APPARATUS

BACKGROUND OF THE INVENTION

1. Field of the Invention

The present invention relates to an image forming system, image forming system, and image forming processing apparatus. More particularly, the present invention relates to an image forming system and image processing apparatus where restrictions may be placed on the printing or outputting of image forming data. Further, the present invention relates to a printing system in which restriction is lifted temporarily depending on the circumstances.

2. Description of the Related Art

With proliferation of printers, anyone can access to a printer for printing out his/her document, the amount of print-out without restraint is becoming increasingly concerned. One way of solving this problem is to allow only authorized users to use a printer or to assign individual user a quota on pages to print for the user. JP 2005-193560A discloses one such system.

Conventional methods of restricting the amount of print-out to a certain number of pages suffers from a problem in that when the maximum number of pages assigned to the user has been reached, a user may not be allowed to print even if a user is desperate to print immediately. This is inconvenient.

JP 2004-345203A discloses a printing system in which users are restricted the use of the printing system. Such a printing system may be installed at a public location such as a computer center of university where many people want to print for various purposes, and allows a large number of users to access under some restriction. If a printing system is installed at a computer center, only professors and teaching assistants may be allowed to print color images. Students may be restricted only to monochrome printing. Further, students may be forced to print in n-up printing.

With a conventional printing system, once a user is restricted the use of the printing system (e.g., color printing) the user is not allowed to perform color printing.

SUMMARY OF THE INVENTION

An object of the invention is to solve the problems of conventional art.

Another object of the invention is to provide an image forming apparatus, image forming system, and image processing apparatus where capable of permitting a user to print when the user is desperate to print immediately.

Still another object of the invention is to provide a printing system where a user is permitted temporarily lift constraints under a predetermined series of steps so that the user can use the printer in a flexible printing environment.

A printing system in which users are restricted in use of a printer, the printing system includes:

a printing section that performs printing in accordance with print data;

a cancellation requesting section that issues a request for cancellation of a print restriction placed on a user, the request being accompanied by an operation mode in which the print data should be printed and information that identifies the user;

a restriction canceling section that makes a decision based on the request to determine whether the printing section should print the print data in the operation mode, the restriction canceling section canceling the print restriction if the restriction canceling section determines that the printing section should print the print data in the printing mode.

The restriction canceling section includes:

a data analyzing section that identifies a name of the user and the state of an operation mode from the print data, the state of the operation mode indicating whether the user requests to perform printing in a temporary permit mode where print restriction on the user is temporarily canceled;

a print restriction information storing section that stores print restriction information indicative of whether the print restriction has been placed on the user;

a print restriction determining section that makes a decision based on the name of the user information and the state of the operation mode to determine whether the printing section should print the print data; and wherein if the data analyzing section determines that the state of the operation mode is the temporary permit mode, the print restriction determining section determines that the printing section should print the print data.

The restriction canceling section includes:

a cancellation information managing section that encodes restriction cancellation information inputted by the user into a first cancellation code and manages the first cancellation code, the restriction cancellation information including information on the print restriction placed on the user, the cancellation information managing section sending the first cancellation code to the user upon a request from the user; and a user information database server that stores a print setting for the user, the user information database server re-producing the restriction cancellation information based on the print setting and the first cancellation code received from the user; and wherein the cancellation requesting section includes:

a print setting processing section that sets the print setting when the print setting processing section receives a print command from the user, the print setting being set based on the reproduced restriction cancellation information.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 2 illustrates a data structure as an example of print restriction information stored in a print restriction information storing section;

FIG. 3 illustrates a data structure as an example of print data transmitted from a client to a printer;

FIG. 4 illustrates an example of an operation mode setting screen that is displayed on a display unit, via a driver-user interface of a printer driver;

FIG. 11 illustrates a data structure of print restriction information previously stored in the print restriction information storing section;

FIG. 12 illustrates a data structure as an example of print data transmitted from a client of the second embodiment to the printer of FIG. 7;

FIG. 16 illustrates a data structure as an example of print restriction information stored in a print restriction information storing section of the fourth embodiment;

FIG. 17 illustrates a data structure as an example of print data transmitted from a client to the printer;

FIG. 21 is a block diagram illustrating a configuration of a sixth embodiment;

FIGS. 22A and 22B illustrate data registered with an administration database;

FIG. 23 illustrates an example of restriction cancellation information in the user information database;

FIG. 25A is a flowchart illustrating a cancellation code obtaining processing;

FIG. 25B illustrates an example of a cancellation information inputting screen;

FIG. 27 is an initial portion of a flowchart illustrating a printing operation;

FIG. 31A is an initial portion of a flowchart illustrating the cancellation code registering processing;

FIG. 31B illustrates an example of a cancellation information inputting screen; and FIG. 32 is an additional portion of the flowchart of FIG. 31A illustrating the operation of an administration database server.

DETAILED DESCRIPTION OF THE INVENTION

First Embodiment

Figure 1:
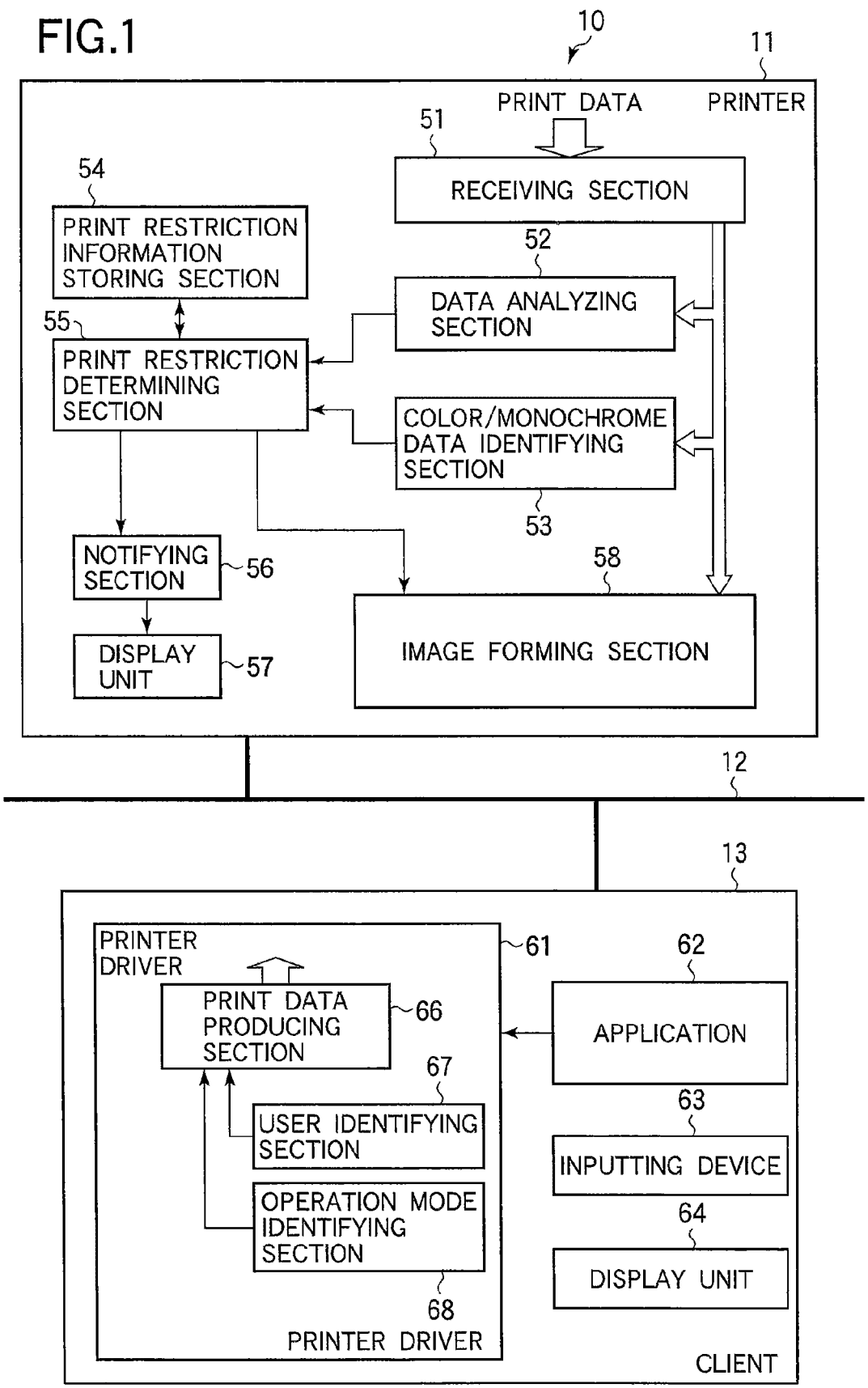
FIG. 1 is a block diagram illustrating a general configuration of an image forming system of a first embodiment.

FIG. 1 is a block diagram illustrating a general configuration of an image forming system 10 of a first embodiment.

The image forming system 10 includes a printer 11 and a client 13 that are connected with each other via a network 12, so that data can be communicated between the printer 11 and the client 13. The client 13 transmits print data including information on a client user and a print permit to the printer 11. The client 13 includes an application 62, a printer driver 61, an inputting device 63 such as a key board, a display unit 64 such as a CRT.

The application 62 is software that produces documents and images, and prints the documents and the images. The printer driver 61 includes an image forming data producing section 66, a user identifying section 67, and an operation mode identifying section 68. When the application 62 issues a print command, the user identifying section 67 identifies a user who requested printing. The operation mode identifying section 68 identifies the setting of operation mode that has been set previously in the printer driver 61. The image forming data producing section 66 converts a variety of drawing instructions into commands as image forming data that can be interpreted in the printer 11. The image forming data producing section 66 also converts print processing information that can be interpreted in the printer 11. The print processing information includes print processing information (i.e., user information) that is identified by the user identifying section 67, and print restricting information (i.e., an operation mode) identified by the operation mode identifying section 68. Then, the image forming data producing section 66 combines these items of data into print data, and transmits the print data to the printer 11.

The printer 11 includes a receiving section 51, a data analyzing section 52, a color/monochrome data identifying section 53, a print restriction determining section 55, an image forming section 58, a display unit 57, a notifying section 56 that indicates to the user when printing is not allowed, and a print restriction information storing section 54 that stores print restriction information on individual users.

The receiving section 51 receives the print data from the client 13. The data analyzing section 52 extracts the user information and the operation mode for the user from the commands contained in the received print data. The color/monochrome data identifying section 53 determines whether the image data in the print data is for color printing or for monochrome printing.

The print restriction determining section 55 reads the print restricting information on the user, who is identified by the data analyzing section 52, from the print restriction information storing section 54. The print restriction determining section 55 also reads the operation mode identified by the data analyzing section 52. Then, the print restriction determining section 55 determines based on these items of information whether printing should be carried out. If printing should be carried out, the print restriction determining section 55 sends a command to print to the image forming section 58, which in turn performs printing in response to the command.

FIG. 2 illustrates a data structure as an example of print restriction information stored in the print restriction information storing section 54. Referring to FIG. 2, the data structure includes individual users and their corresponding print restrictions. For example, the quota on pages to print for "SMITH" has been used up already. Therefore, the print restriction for SMITH is "ON". The print restriction for "LINCOLN" has not been set to "ON" yet.

FIG. 3 illustrates a data structure as an example of print data transmitted from the client 13 to the printer 11. Referring to FIG. 3, the print data transmitted from the client 13 includes user name="SMITH", operation mode="TEMPORARY PERMIT MODE", and image forming data="COLOR DATA".

FIG. 4 illustrates an example of an operation mode setting screen that is displayed on the display unit 64, via a driver-user interface of the printer driver 61. The printer driver 61 includes two options: "NORMAL MODE" and "TEMPORARY PERMIT MODE". "NORMAL MODE" is a mode in which the state of the print restriction is checked for each user stored in the print restriction information storing section 54 of the printer 11 to determine whether printing should be carried out for the user. If the print restriction is in the "ON" state, printing is allowed. If the print restriction is in the "OFF" state, printing is allowed.

"TEMPORARY PERMIT MODE" is a mode in which the user is allowed to print despite the fact that the state of the print restriction for the user is "ON". The print restriction for "SMITH" is in the "ON" state in FIG. 2, but the operation mode for "SMITH" is "TEMPORARY PERMIT MODE" in FIG. 3. Thus, the print restriction is temporarily disabled, and the image forming data is printed.

Figure 5:
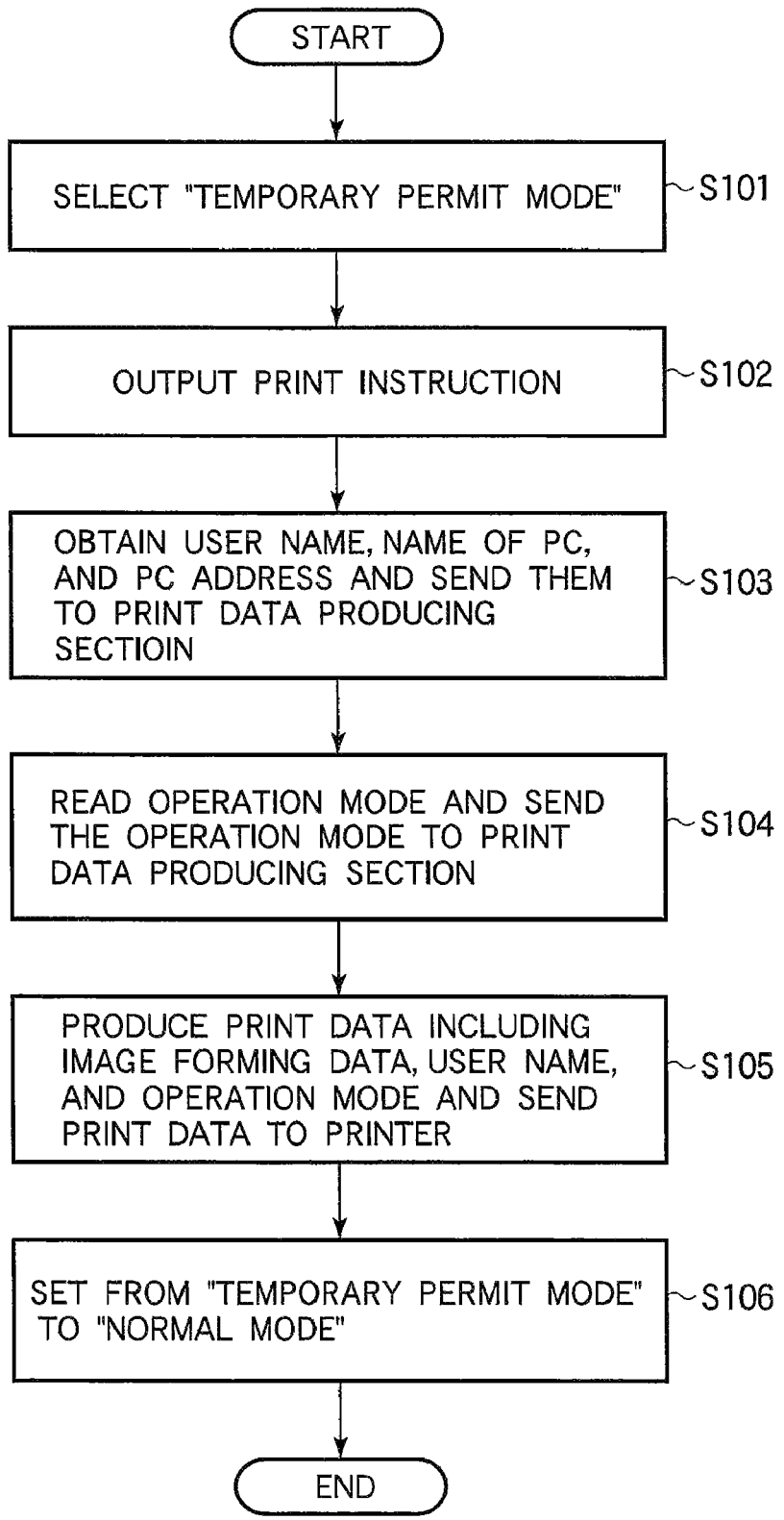
FIG. 5 is a flowchart illustrating the operation of the client.

The operation of the image forming systems of the aforementioned configuration will be described. FIG. 5 is a flowchart illustrating the operation of the client 13. The flowchart assumes that the user is "SMITH". The operation of the client 13 will be described.

"SMITH" is desperate to print urgently and opens the operation mode setting screen (step S101). Then, the user selects the operation mode within the property of the print driver 61 by clicking the checkbox of "TEMPORARY PERMIT MODE".

When the application outputs a print instruction (S102), the user identifying section 67 obtains the user name, the name of PC, and PC address, and transfers these items of information to, for example, the image forming data producing section 66 (step S103). A screen is displayed on the display unit 64 via the driver interface so that the user inputs his name via the inputting device 63. The operation mode identifying section 68 reads the operation mode, which has been set at step S101, via the driver interface, and then sends the operation mode to the image forming data producing section 66 (step S104).

The image forming data producing section 66 converts image forming data into print data that can be interpreted by the printer 11, and transmits the print data that includes the user information and the operation mode to the printer 211 (step S105). After transmission of print data, the printer driver 61 automatically resets the operation mode from "TEMPORARY PERMIT MODE" to "NORMAL MODE" (step S106). Thus, when the next print instruction is issued next, "NORMAL MODE" will be set unless the user sets "TEMPORARY PERMIT MODE" again.

Figure 6:
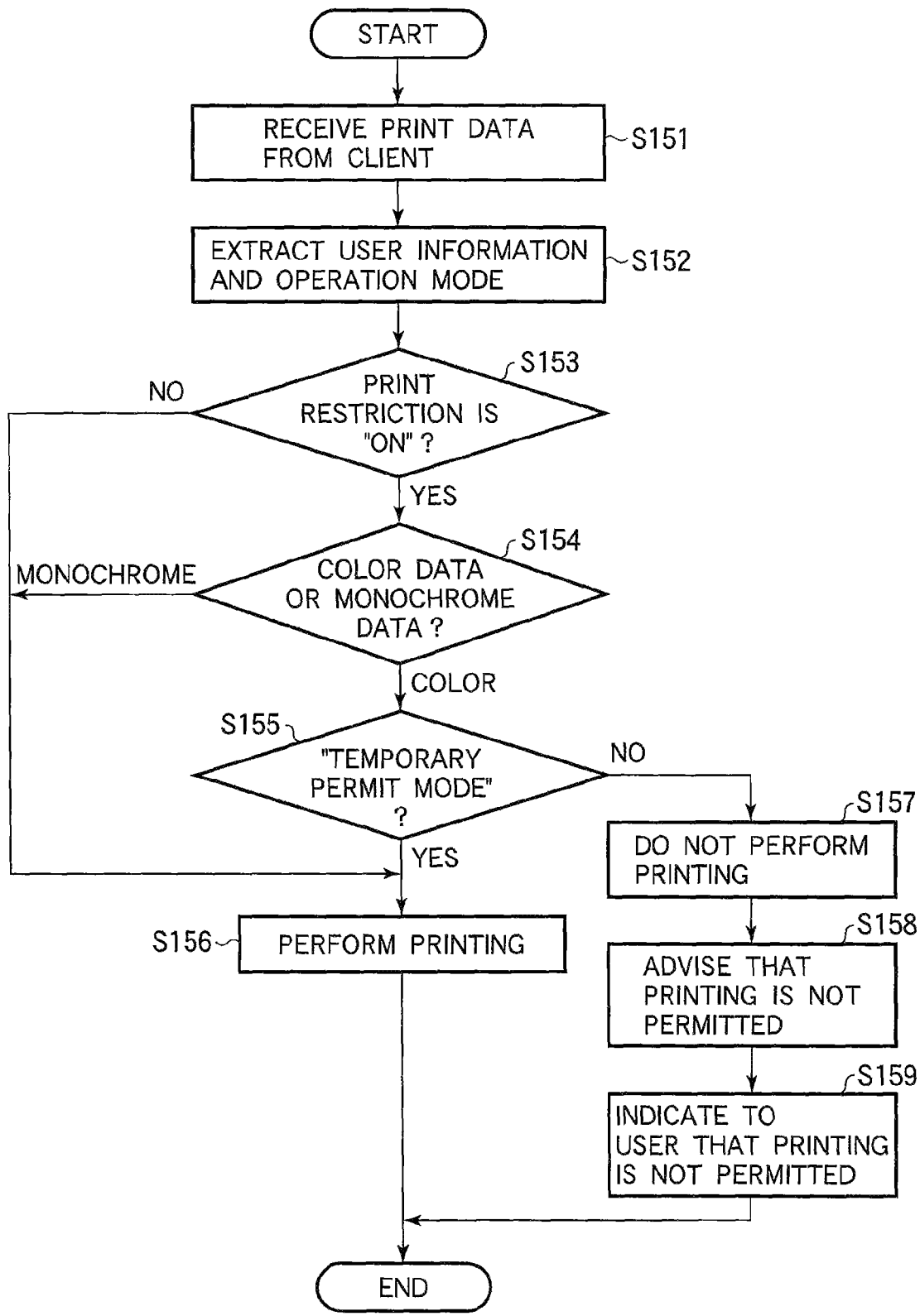
FIG. 6 is a flowchart illustrating the operation of the printer.

FIG. 6 is a flowchart illustrating the operation of the printer 11. The operation of the printer 11 will be described with reference to FIG. 6.

The receiving section 51 receives the print data from the client 13 (step S151), and extracts the user information and the operation mode for the user from the commands contained in the received print data (step S152). Then, the print restriction determining section 55 makes a decision to determine whether printing should be carried out, i.e., whether the state of the print restrictions is "ON" or "OFF" (step S153). If the answer is NO, (NO at step S156), the program proceeds to step S156 where printing is performed immediately. If the answer is YES (YES at step S153), a check is made to determine whether the image data is color data or monochrome data (step S154).

If the image data is monochrome data, the program proceeds to step S156 where printing is performed immediately. If the image data is color data, the program proceeds to step S155 where a check is made to determine whether the operation mode is "TEMPORARY PERMIT MODE" (step S155). If the operation mode is "TEMPORARY PERMIT MODE" (YES at step S155), the program proceeds to step S156 where printing is performed immediately. If the operation mode is "NORMAL MODE" (NO at step S155), the program proceeds to step S157 where printing is not performed. Then, the program proceeds to step S158 where the notifying section 56 advises the user by means of, for example, a set of characters that printing is not permitted (step S159), and the display unit 57 displays by means of a set of characters that printing is not permitted (step S159).

As described above, if "SMITH" is the user who has been set to print restriction, the operation mode is set to "TEMPORARY PERMIT MODE," and the image forming data is color data, then the program proceeds through steps S151-S156 to print the image forming data. If "SMITH" is set to print restriction, the image forming data is color data, and the operation mode is "NORMAL MODE," the image forming data is not printed.

In the first embodiment, the permit information is a single item of information. Instead, the permit information may be a combination of a plurality of items of information including, for example, a password, in which case, the processing may be additionally altered as follows:

(1) When "TEMPORARY PERMIT MODE" is selected, a password is requested.
(2) A user inputs a password. This password may be processed at step S101 (FIG. 5).
(3) The driver transmits the password and the operation mode (i.e., "TEMPORARY PERMIT MODE") to the printer. The password and the operation mode are processed simultaneously at step S105 (FIG. 5).
(4) When the operation mode is "TEMPORARY PERMIT MODE", the printer compares the received password with passwords previously stored in the printer, and permits printing if the passwords are coincident. This processing may be performed at step S155 (FIG. 6). Instead of using "TEMPORARY PERMIT MODE", the user may input only a password and printing may be permitted only when the received password coincides one of the passwords previously stored in the printer.

The advice issued by the notifying section 56 to the user may be transmitted in the form of data to the client so that the data may be displayed on the display unit 64.

As described above, if a user is desperate to print, the user may be allowed to print despite the fact that the user is subjected to print restriction.

Second Embodiment

Figures 7, 8:
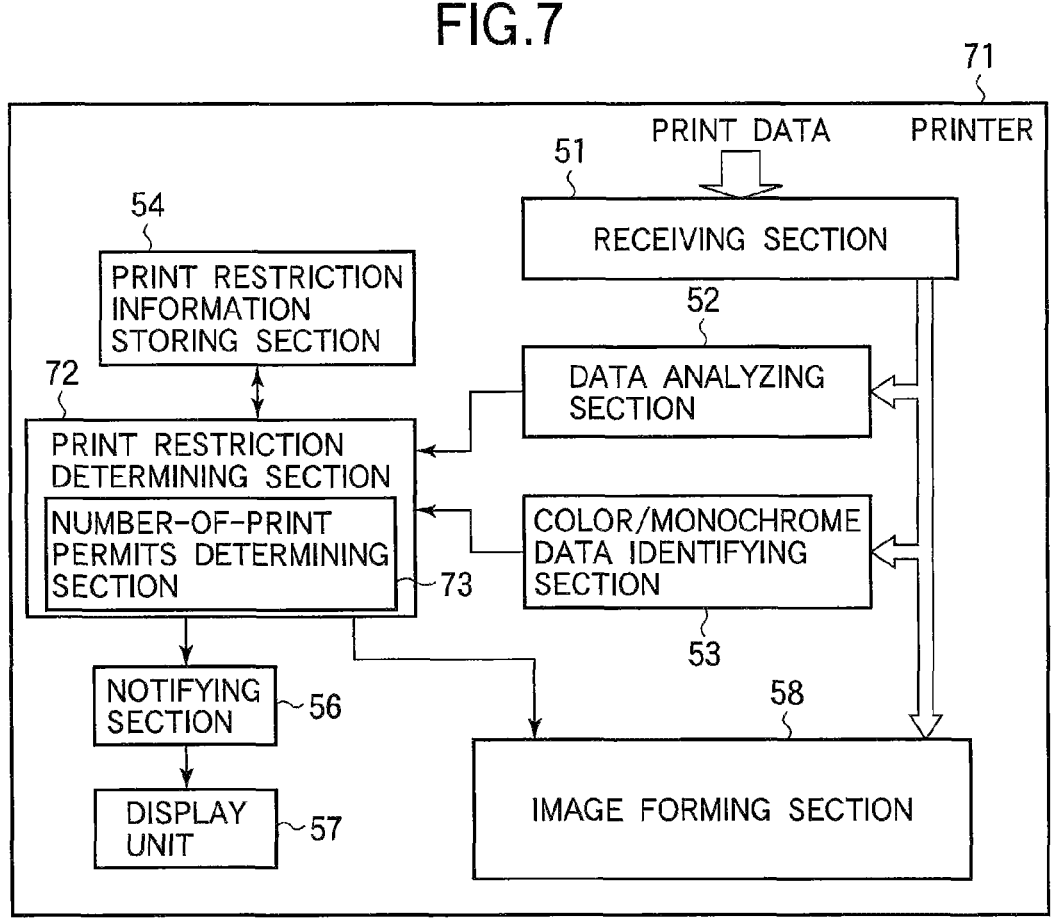
FIG. 7 is a block diagram illustrating the configuration of a printer of a second embodiment.
FIG. 8 illustrates a data structure as an example of print restriction information stored in a print restriction information storing section.

FIG. 7 is a block diagram illustrating the configuration of a printer 71 of a second embodiment.

The printer 71 differs from the printer 11 in that a number-of-print permits determining section 73 is added to a print restriction determining section 72. Elements similar to those in the first embodiment have been given the same reference numerals and their description is omitted. An image forming system of the second embodiment differs from that of the first embodiment in that the printer 71 is used in place of the printer 11 in FIG. 1.

FIG. 8 illustrates a data structure as an example of print restriction information stored in the print restriction information storing section 54. Referring to FIG. 8, the each item of data includes a user, print restriction ("ON" or "OFF" of color printing) for the user, and permit condition. The permit condition represents the remaining number of times of performing printing when print restriction is cancelled.

The print restriction of "SMITH" is set "ON" (e.g., the quota on pages to print for "SMITH" has been used up), and the permit condition (i.e., the number of times of performing printing) is 10 times. The print restriction of user "LINCOLN" is set "OFF" and the permit condition (i.e., the number of times of performing printing) is 10 times.

A client 13 transmits print data to the printer 71. FIG. 3 illustrates an example of the print data. Referring to FIG. 3, the user name and operation mode of the print data transmitted from the client 13 are "SMITH" and "TEMPORARY PERMIT MODE", respectively, and the image forming data is color data. The detailed description of the client 13 is omitted.

Figure 9:
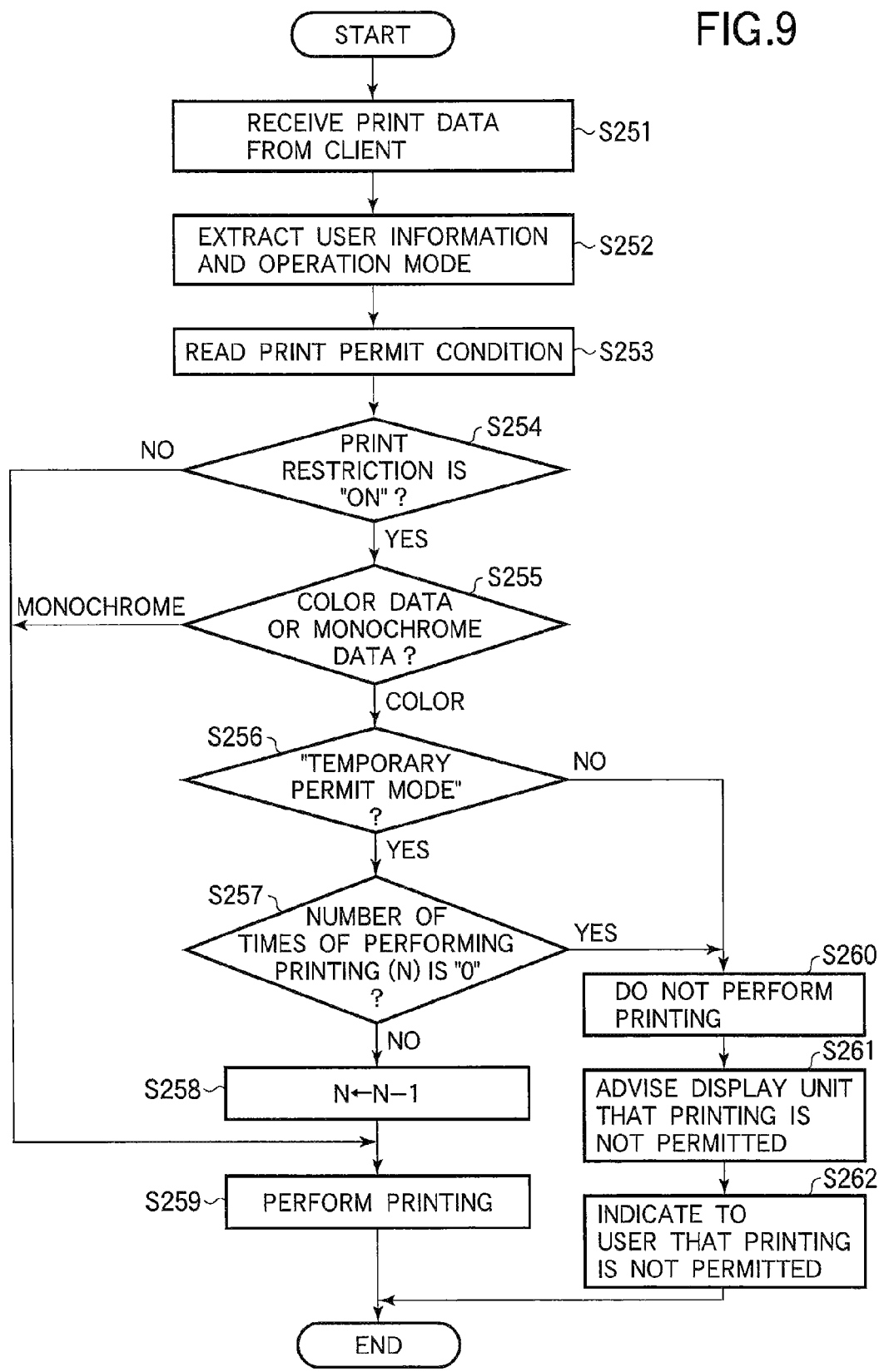
FIG. 9 is a flowchart illustrating the operation of the printer of FIG. 7.

FIG. 9 is a flowchart illustrating the operation of the printer 71. The operation of the printer 71 will be described with reference to the flowchart.

A receiving section 51 receives the print data form the client 13 (step S251), and extracts the user information and the operation mode for the user from the received print data (step S252). Then, the print restriction information storing section 54 reads the permit condition (i.e., the number of print permits) from the print data (step S253). The print restriction determining section 55 determines whether printing should be carried out, i.e., the state of print restrictions is "ON" or "OFF" (step S254). If the answer is NO, (NO at step S254), the program proceeds to step S259 where printing is performed immediately. If the answer is YES (YES at step S254), a check is made to determine whether the image data is color data or monochrome data (step S255).

If the image data is monochrome data, the program proceeds to step S259 where printing is performed immediately. If the image data is color data, the program proceeds to step S256 where a check is made to determine whether the operation mode is "TEMPORARY PERMIT MODE". If the operation mode is "TEMPORARY PERMIT MODE" (YES at step S256), the program proceeds to step S257 where a check is made to determine whether the permit condition (the number of print permits) is "0". If the operation mode is "NORMAL MODE" at step 256 or permit condition is "0", the program proceeds to step S260 where printing is not performed.

If printing is not to be performed, the notifying section 56 advises the user that printing is not permitted (step S261), and the display unit 57 displays by means of a set of characters that printing is not permitted (step S262).

If the permit condition is not "0" at step S257, the permit condition (i.e., the remaining number of times of performing printing) is decremented by "1" (step S258), and then printing is performed (step S259).

As described above, if "SMITH" is the user who has been set to print restriction as shown in FIG. 2, the operation mode is set to "TEMPORARY PERMIT MODE", and the image forming data is color data, then the program proceeds through steps S251-S259 to continue to print the image forming data until the number of remaining times of print permits reaches "0". If "SMITH" is set to print restriction and the image forming data is color data, and if the operation mode is "NORMAL MODE" or the number of remaining times of print permits has reached "0", the image forming data is not printed.

As described above, the number of times of performing printing in the "TEMPORARY PERMIT MODE" is set, and "TEMPORARY PERMIT MODE" is not permitted after the number of times of performing printing has been reached "0". Instead, the user may continue to be allowed to print, and when the quota on pages to print has been used up, the log (user information, total number of printed pages, time at which individual printing operations are performed) may be written into the memory area or reported to the system administrator. Still alternatively, the number of remaining times (N) of performing printing may be transmitted to the client which in turn displays the number of remaining times (N). For example, FIG. 4 illustrates an example "TEMPORARY PERMIT MODE (N is 4).

The advice issued by the notifying section 56 to the user may be transmitted in the form of data to the client so that the data may be displayed on the display unit 64. In the first embodiment, the permit information is a single item of information. Instead, the permit information may be a combination of a plurality of items of information including, for example, a password.

As described above, if a user is desperate to print, the user may be allowed to print even though the user is subjected to print restriction. Further, the image forming system of the second embodiment is capable of restricting the number of times of performing printing in the "TEMPORARY PERMIT MODE."

Instead of restricting the number of times of performing printing in the "TEMPORARY PERMIT MODE," the number of pages to be printed may be restricted.

Third Embodiment

Figure 10:
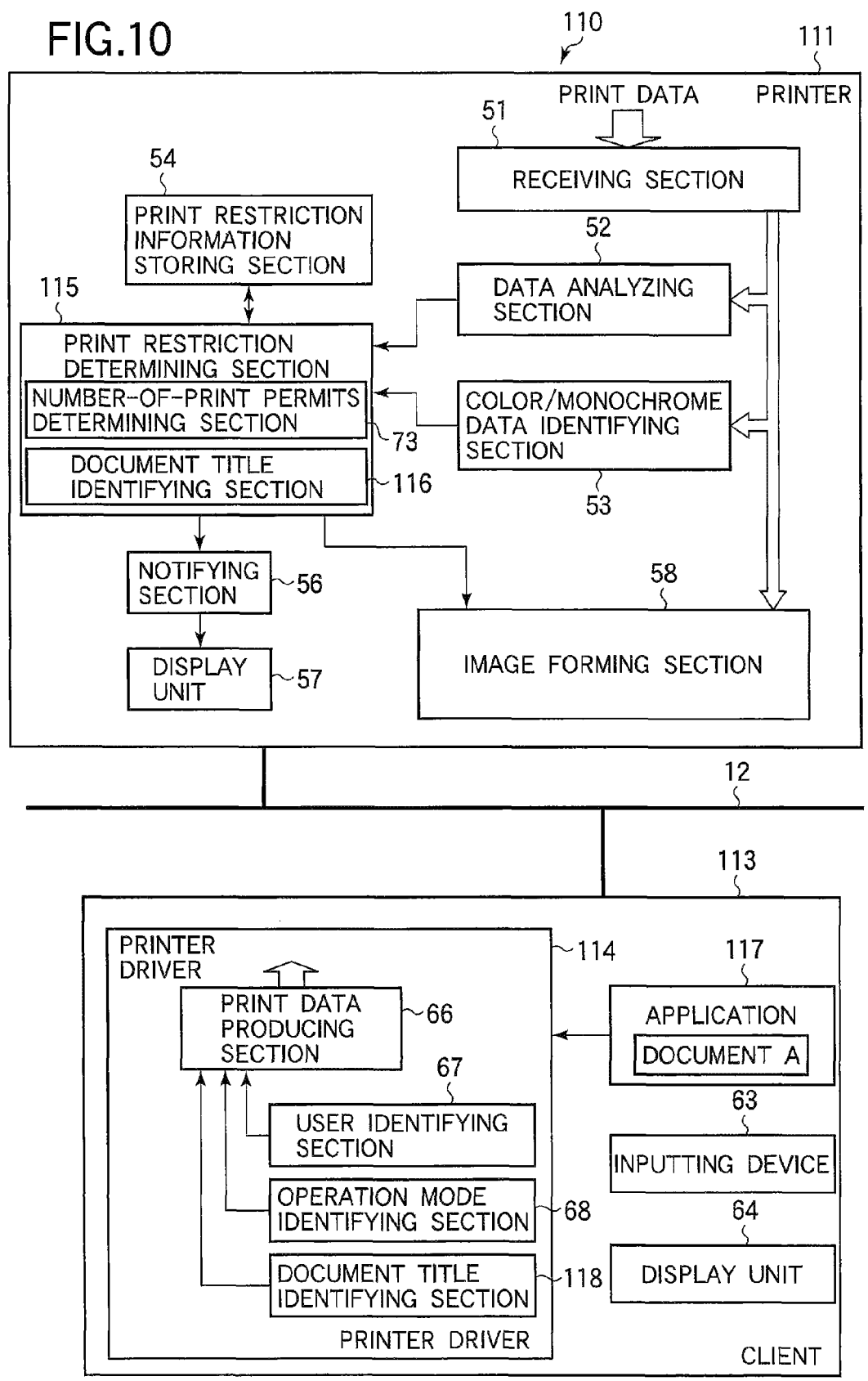
FIG. 10 is a block diagram illustrating an image forming system of a third embodiment.

FIG. 10 is a block diagram illustrating an image forming system 110 of a third embodiment.

The image forming system 110 differs from the image forming system 10 of the first embodiment in that a document title identifying section 118 is added to a client 113 and a document title identifying section 116 is added to a printer 111.

Referring to FIG. 10, the document title identifying section 118 identifies the title of a document of the image forming data produced by an application 117. An image forming data producing section 66 converts various drawing instructions, which is received in a printer driver 114 from an application 117, into commands that can be interpreted by the printer 111. The image forming data producing section 66 also converts print processing information that can be interpreted in the printer 111. The print processing information includes print processing information (i.e., user information) identified by the user identifying section 67, an operation mode identified by the operation mode identifying section 68, and the title of a document identified by the document title identifying section 118. Then, the image forming data producing section 66 converts these items of data into the print data, and then transmits the print data to the printer 111.

A print restriction determining section 115 of the printer 111 incorporates a number-of-print permits determining section 73 and a document title identifying section 116.

FIG. 11 illustrates a data structure of print restriction information previously stored in the print restriction information storing section 54. Referring to FIG. 11, the data includes a user, print restriction ("ON" state or "OFF" state) permit condition, and title-of a document ((ドキュメント名)) that was printed last time in "TEMPORARY PERMIT MODE". In this example, for "SMITH", print restriction is "ON" (e.g., due to the fact that the quota on pages to print has been used up), permit condition (the number of times of performing printing) is 10, and the title of a document is "ACCOUNTING DATA.doc". For "LINCOLN", print restriction is "OFF", i.e., no print restriction is set.

FIG. 12 illustrates a data structure as an example of print data transmitted from the client 113 to the printer 111. Referring to FIG. 12, the print data transmitted from the client 13 includes user name="SMITH", operation mode="TEMPORARY PERMIT MODE", title of a document="ACCOUNTING DATA.doc", and image forming data="COLOR DATA."

The operation of the image forming system of the aforementioned configuration will be described.

Figure 13:
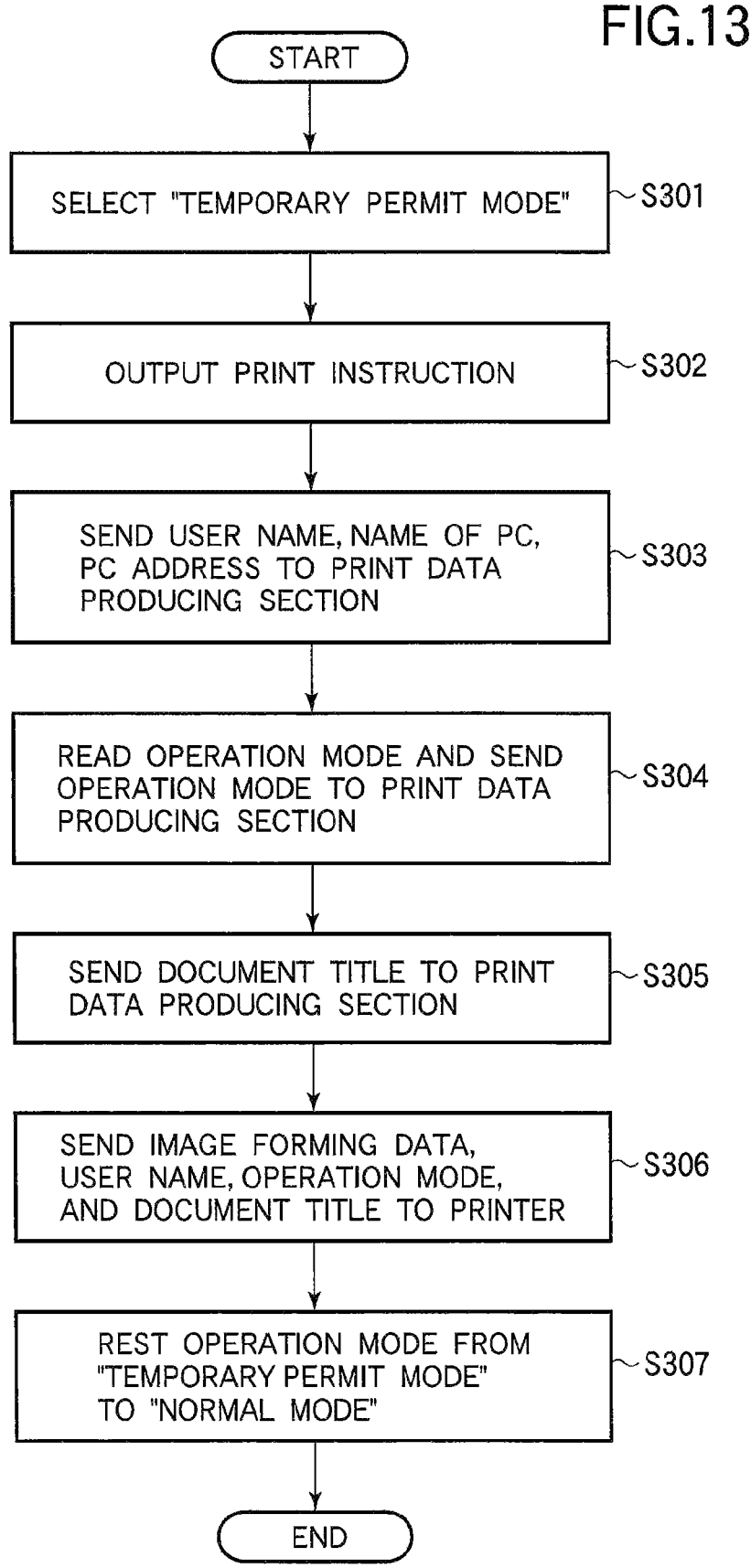
FIG. 13 is a flowchart illustrating the operation of the client of FIG. 12.

FIG. 13 is a flowchart illustrating the operation of the client 113. The flowchart assumes that the user is "SMITH". The operation of the client 13 will be described.

"SMITH" is desperate to print immediately and opens the operation mode setting screen. Then, the user selects the operation mode by clicking on the checkbox of "TEMPORARY PERMIT MODE" (step S301).

When the application outputs a print instruction (step S302) the user identifying section 67 obtains the user information including the user name "SMITH", the name of PC, and PC address, and sends these items of information to, for example, the image forming data producing section 66 (step S303). The operation mode identifying section 68 reads the operation mode, which has been set at step S301, via the driver user interface, and then transfers the operation mode to the image forming data producing section 66 (step S304). When the application 117 outputs a print command, the document title identifying section 118 identifies the document title of the image forming data received from the application 117. Then, the document title identifying section 118 sends the document title to the image forming data producing section 66 (step S305).

The image forming data producing section 66 produces image forming data as print data that includes the user information, operation mode, and document title, the print data being in the form that can be interpreted by the printer 111. Then, the image forming data producing section 66 transmits the print data to the printer 111 (step S306). After transmission of the print data, the printer driver 114 automatically resets the operation mode from "TEMPORARY PERMIT MODE" to "NORMAL MODE" (step S307). Thus, when the next print instruction is issued next time, "NORMAL MODE" will be set unless the user sets "TEMPORARY PERMIT MODE" again.

Figure 14:
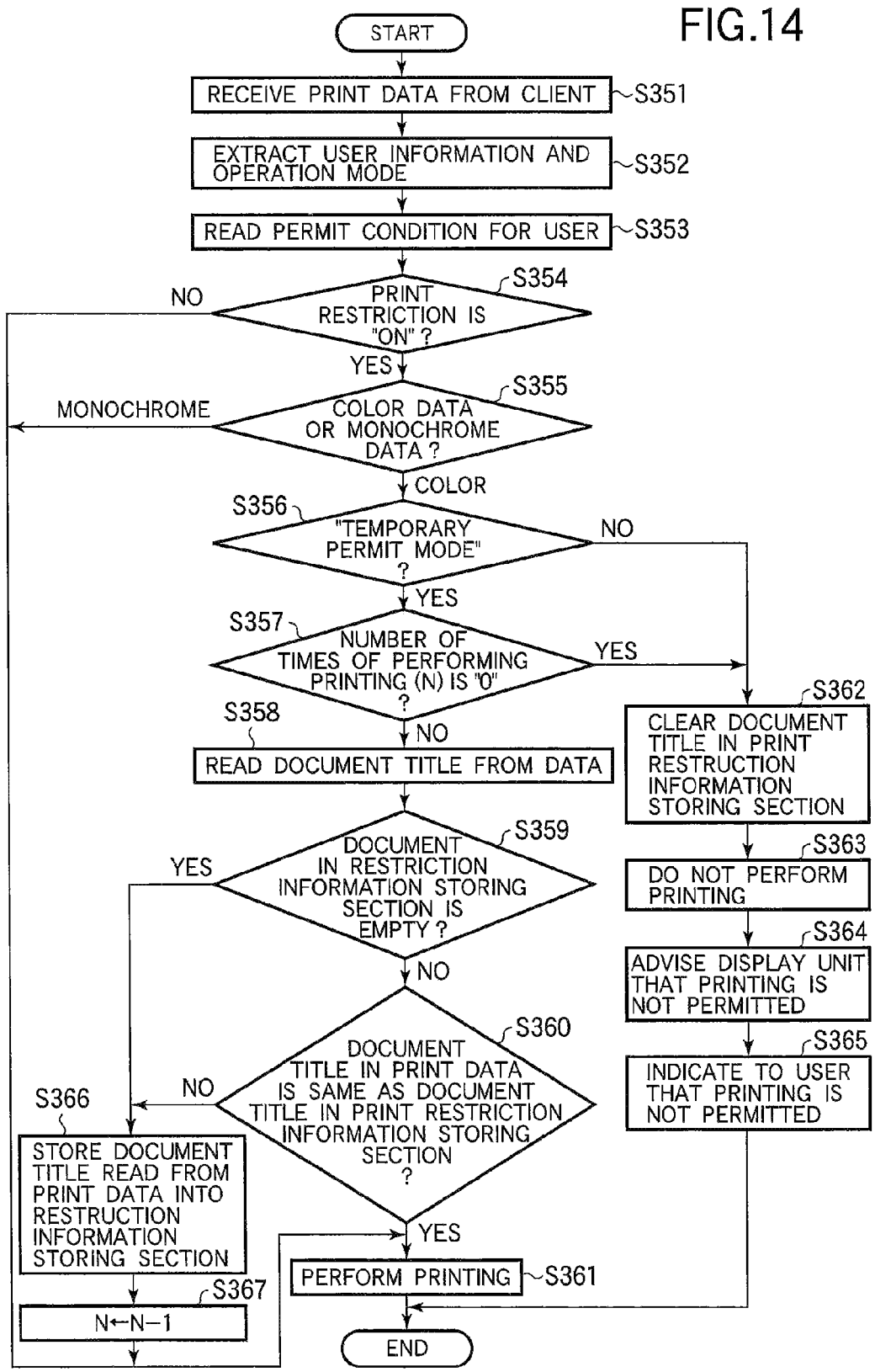
FIG. 14 is a flowchart illustrating the operation of the printer.

FIG. 14 is a flowchart illustrating the operation of the printer 111. The operation of the printer 111 will be described with reference to FIG. 14.

A receiving section 51 receives the print data form the client 113 (step S351), and extracts the user information and the operation mode for the user from the commands contained in the received print data (step S352). Then, the permit condition (the number of print permits and document title assigned to the user are read out from the print restriction information storing section 54 (see FIG. 11, step S353). Then, the print restriction determining section 55 determines whether print restriction has been set to the user (i.e., whether printing should be carried out) (step S354). If the answer is NO, (NO at step S354), the program proceeds to step S361 where printing is performed immediately. If the answer is YES (YES at step S354), a check is made to determine whether the image data is color data or monochrome data (step S355).

If the image data is monochrome data, the program proceeds to step S361 where printing is performed immediately. If the image data is color data, the program proceeds to step S356 where a check is made to determine whether the operation mode is "TEMPORARY PERMIT MODE". If the operation mode is "TEMPORARY PERMIT MODE" (YES at step S356), the program proceeds to step S362 where the document title stored in the print restriction information storing section 54 is cleared. If the operation mode is "NORMAL MODE" (NO at step S356), the program proceeds to step S362 where the document title stored in the print restriction information storing section 54 is cleared. Then, printing is not performed (step S363).

As described above, if "SMITH" is the user who has been set to print restriction (i.e., the operation mode is set to "TEMPORARY PERMIT MODE", then the notifying section 56 notifies the display unit 57 that printing is not allowed (step S364). The display unit 57 displays, for example, a set of characters indicative that the user is not allowed to print (step S365).

If the permit condition (i.e., the number of times of performing printing) is not "0" (NO at step S357, the document title is read from the print data (step s358) and a check is made to determine whether the document title in the print restriction information storing section 54 for the user is empty (step S359). If the document title in the print restriction information storing section 54 is not empty (NO at step S359), then a check is made to determine whether the document title read from the print data is the same as that read from the print restriction information storing section 54 (step S360).

If the document title is empty (YES step S359), then the program proceeds to step S366. If the two document titles are not coincident (YES step S360), the program proceeds to step S366. At step S366, the document title read from the print data is overwritten onto the area of document title in the print restriction information storing section 54 (step S366). Then, the permit condition (the number of remaining times of performing printing, N) is decremented by "1" (step S367), and thereafter printing is performed (step S361).

If print restriction is set to "SMITH" who sent the print data, the operation mode is "TEMPORARY PERMIT MODE", the document title is "ACCOUNTING DATA.doc", and the image forming data is color data, then the print data is printed through steps S351-S361 without decrementing the remaining number of times of performing printing because the "ACCOUNTING DATA.doc" has been stored previously. If the document title is not "ACCOUNTING DATA.doc," a new document title is stored and the image forming data is printed, in which case, the remaining number of times of performing printing is decremented.

If restriction is set to the user, the operation mode is "TEMPORARY PERMIT MODE", and the image forming data is color data, and if the operation mode is "NORMAL MODE" or the number of times of performing printing is "0", then the image data is not printed.

In the third embodiment, the permit information is a single item of information. Instead, the permit information may be a combination of a plurality of items of information including, for example, a combination of restriction permit and a password.

Alternatively, step S360 may be performed shortly after step S354 so that printing may be carried out if the answer is YES at step S366 and steps S355-S357 are executed if the answer is NO at step S360. This alternative allows printing without setting "TEMPORARY PERMIT MODE".

As described above, if user is desperate immediately, a user may be allowed to print even though the user is under print restriction. Further, the image forming system of the third embodiment is capable of restricting the number of times of performing printing in "TEMPORARY PERMIT MODE". If print data has the same document title as that printed last time, printing is allowed without decrementing the remaining number of ties of performing printing. This enables the document to be re-printed without decrementing the remaining number of ties of performing printing, for example, when a modification should be made to the document.

Fourth Embodiment

Figure 15:
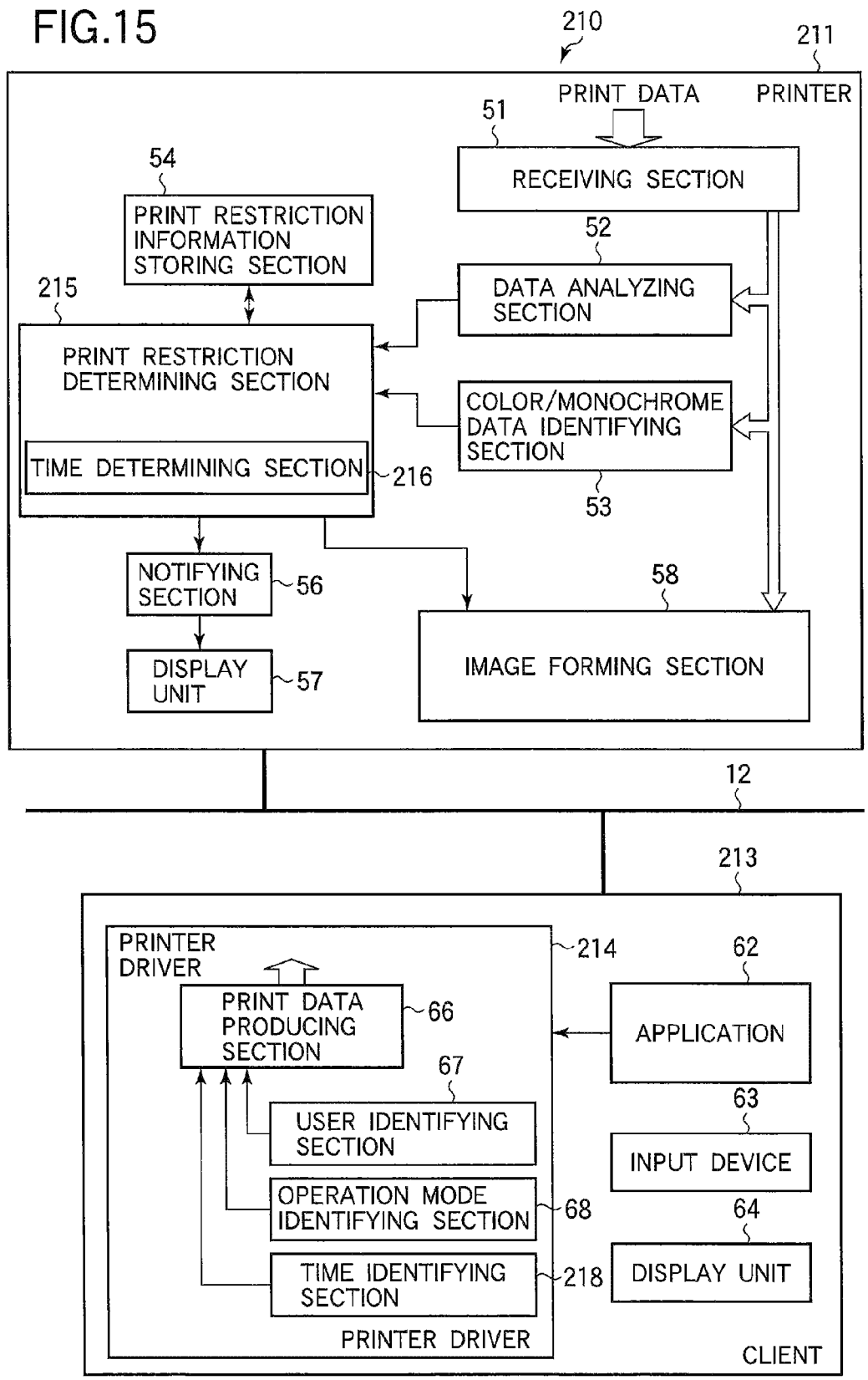
FIG. 15 is a block diagram illustrating an image forming system of a fourth embodiment.

FIG. 15 is a block diagram illustrating an image forming system 210 of a fourth embodiment.

The image forming system 210 differs from the image forming system 10 of the first embodiment in that a print time identifying section 218 is added to a client 213 and a time identifying section 216 is added to a printer 211. Elements similar to those of the image forming system 10 (FIG. 1) have been given the same reference numerals and their description ifs omitted.

Referring to FIG. 15, the client 213 incorporates the print time identifying section 218 in a printer driver 214. The print time identifying section 218 identifies the time at which a user inputs a print command. An image forming data producing section 66 converts a variety of drawing instructions into commands as image forming data. The image data is in the format that can be interpreted in the printer. An image forming data producing section 66 also converts print processing information that can be interpreted in the printer 211. The print processing information includes user information identified by a user identifying section 67, an operation mode identified by an operation mode identifying section 68, and a time-of-day of printing identified by the print time identifying section 218. Then, the image forming data producing section 66 combines these items of data into print data, and transmits the print data to the printer 211.

The printer 211 incorporates the time identifying section 216 in a print restriction information storing section 215.

FIG. 16 illustrates a data structure as an example of print restriction information stored in a print restriction information storing section 54. Referring to FIG. 16, for individual users, the data structure includes individual users, their corresponding "ON" states and "OFF" states of print restriction, restriction of the available amount of time for printing after the system enters "TEMPORARY PERMIT MODE", and the time-of-day of printing at which the first printing is performed after the system enters the "TEMPORARY PERMIT MODE". For "SMITH", the print restriction is "ON", permit condition (the available amount of time for printing is 60 minutes, and information is absent from the time-of-day of printing. The fact that the information is absent from the time-of-day of printing is that printing has not been performed in "TEMPORARY PERMIT MODE" yet. For the user "LINCOLN", the print restriction is "OFF".

FIG. 17 illustrates a data structure as an example of print data transmitted from the client 213 to the printer 211. The print data transmitted from the client 213 includes user name="SMITH", operation mode="TEMPORARY PERMIT MODE", time-of-day of printing=9:00, in Oct. 4, 2005, and image forming data="COLOR DATA".

The operation of the image forming system of the aforementioned configuration will be described.

Figure 18:
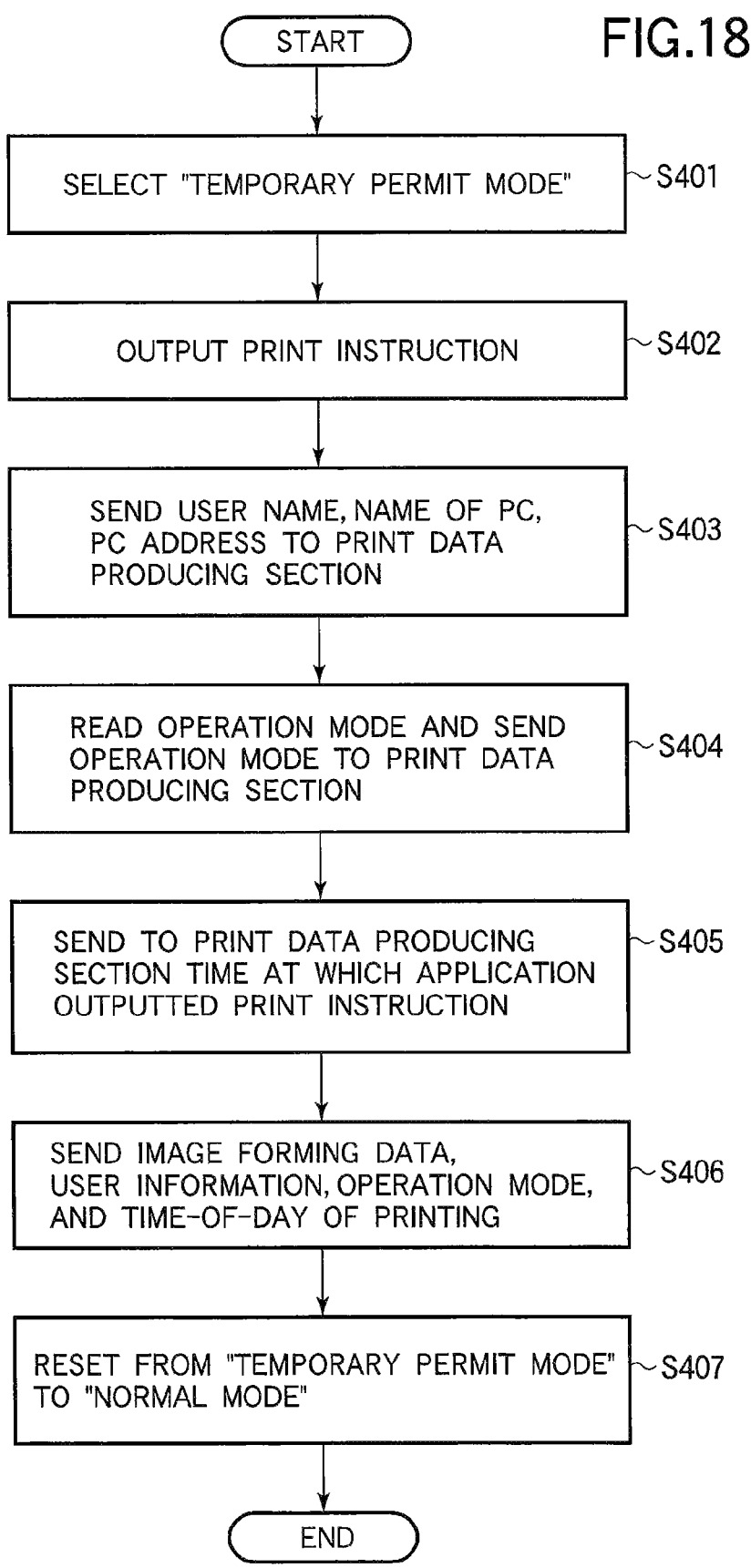
FIG. 18 is a flowchart illustrating the operation of the client of FIG. 17.

FIG. 18 is a flowchart illustrating the operation of the client 213. It is assumed that "SMITH" is subjected to print restriction. The operation of the client 213 will be described.

"SMITH" is desperate to print immediately, and opens an operation mode setting screen (FIG. 4). The user selects the operation mode in the property of the printer driver 214 by clicking the checkbox of "TEMPORARY PERMIT MODE" (step S401).

When an application outputs a print instruction, the user identifying section 67 obtains the user name, the name of PC, and PC address, and sends these items of information to, for example, the image forming data producing section 66 (step S403). The operation mode identifying section 68 reads the operation mode, which has been set at step S401, via the driver/user interface, and then sends the operation mode to the image forming data producing section 66 (step S404). The print time identifying section 218 identifies the time at which the application outputted the print instruction, and then transfers the identified time to the image forming data producing section 66 (step S405).

The image forming data producing section 66 produces print data including image forming data (i.e., a variety of drawing instructions), user information, operation mode, and time-of-day of printing that are in the format that can be interpreted in the printer 11. Then, the image forming data producing section 66 transmits the print data together with the user information and the operation mode to the printer 211 (step S406). After transmission of print data to the printer 211, the printer driver 214 automatically resets the operation mode from "TEMPORARY PERMIT MODE" to "NORMAL MODE" (step S407). Thus, when a print instruction is issued next, "NORMAL MODE" will be set unless the user sets "TEMPORARY PERMIT MODE" again.

Figure 19:
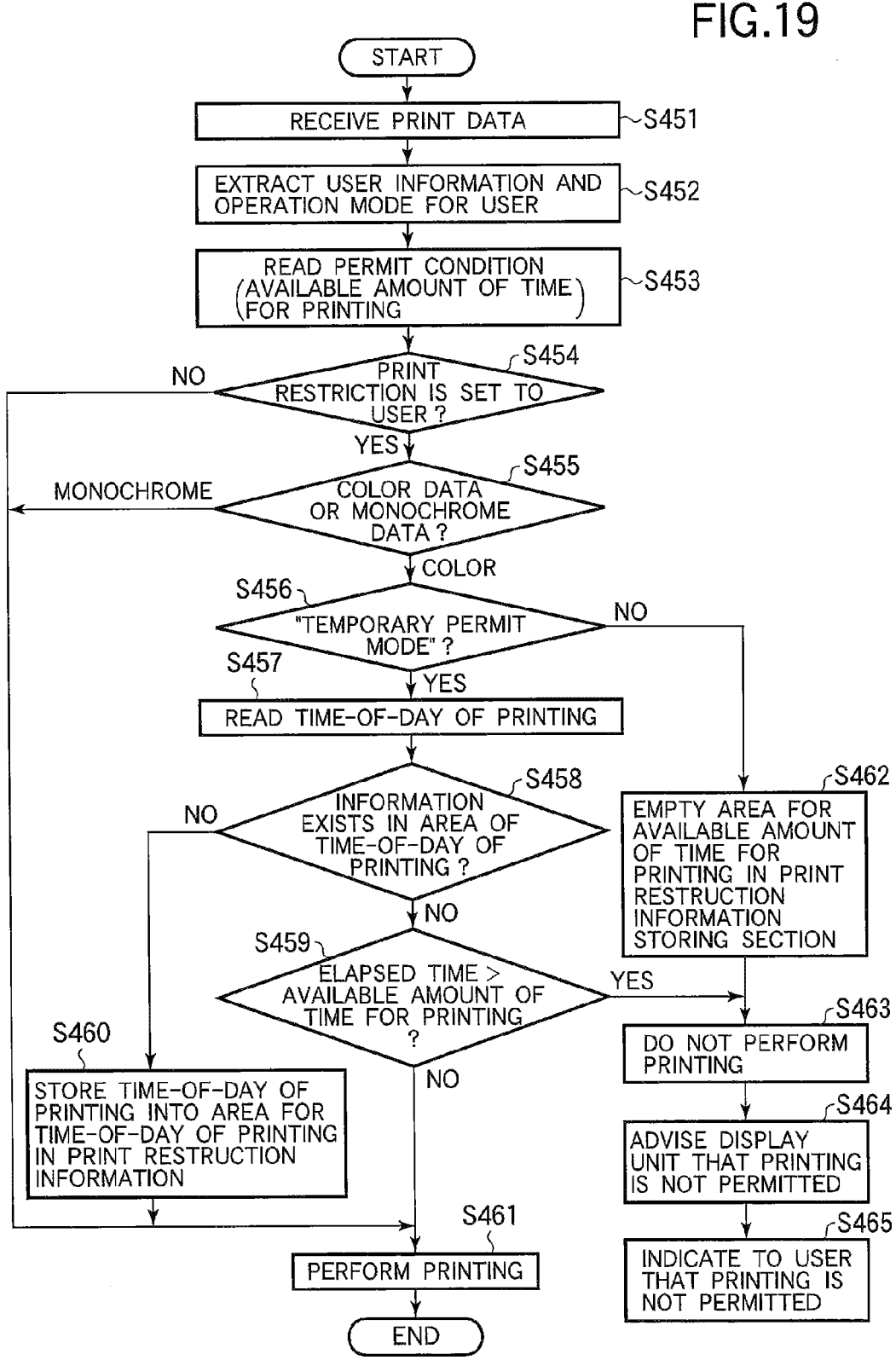
FIG. 19 is a flowchart illustrating the operation of the printer.

FIG. 19 is a flowchart illustrating the operation of the printer 211. The operation of the printer 211 will be described with reference to FIG. 19.

The receiving section 51 receives the print data from the client 213 (step S451), and extracts the user information and the operation mode for the user from the commands contained in the received print data (step S452). Then, the print restriction determining section 55 reads the permit condition (available amount of time for printing and time-of-day of printing assigned to the user from the print restriction information storing section 54 (step S453). The print restriction determining section 55 then determines whether print restriction is set to the user (i.e., whether printing should be carried out) (step S454). If the answer is NO at step S454, the program proceeds to step S461 where printing is performed immediately. If the answer is YES at step S454, a check is made to determine whether the image data is color data or monochrome data (step S455).

If the image data is monochrome data, the program proceeds to step S461 where printing is performed immediately. If the image data is color data, the program proceeds to step S456 where a check is made to determine whether the operation mode is "TEMPORARY PERMIT MODE". If the operation mode is "NORMAL MODE" (NO at step S456), the area for the available amount of time for printing in the print restriction information (step S462) is emptied (step S462) and printing is not performed (step S463). If printing is not performed, the notifying section 56 notifies the display unit 57 that printing is not allowed (step S464). The display unit 57 displays to the user by means of a set of characters indicative that printing is not allowed (step S465).

If the operation mode is "TEMPORARY PERMIT MODE" (YES at step S456), the time-of-day of printing information is extracted from the print data (step S457). The print restriction determining section 55 checks the memory area in the print information storing section 54 for the time-of-day of printing to determine whether a specific time has been stored in the area (step S458).

If the area for the time-of-day of printing is empty due to the fact that printing has not been performed in "TEMPORARY PERMIT MODE" yet (NO at step S458), the print information storing section 54 stores the time-of-day of printing read out at step S457 into a corresponding area for the time-of-day of printing in the print restriction information (FIG. 16) (step S460), and the image forming section 58 performs printing (step S461). If printing has been performed in "TEMPORARY PERMIT MODE" and the time-of-day of printing for the print data has been stored (YES at step S458), the print restriction determining section 55 compares at step S459 the print time read out at step S457 with the time-of-day of printing stored in the area, thereby determining whether the time elapsed from the time-of-day of printing for the print data that has been printed to the time-of-day of printing for the print data that is going to be printed exceeds the available amount of time for printing (60 minutes) read out at step S453. If the elapsed time has not exceeded the available amount of time for printing (NO at step S459), printing is performed (S461). If the elapsed time has exceeded (YES at step S459), the program proceeds to step S463 where printing is not performed.

As described above, if "SMITH" is the user who has been set to print restriction, the operation mode is set to "TEMPORARY PERMIT MODE", and the time-of-day of printing is "9:00, Oct. 4, 2005", then the area for the time-of-day of printing is empty in the print restriction information storing section 54. Thus, printing is performed by executing steps S451-S458 and step S460 to print the image forming data. During the printing, the time-of-day of printing "9:00, Oct. 4, 2005" is stored into the area for the time-of-day of printing in the print restriction information storing section 54.

Likewise, if the print data having a specific print time within 60 minutes of "9:00, Oct. 4, 2005" is transmitted, steps S451-S459 and S461 are performed to print the image data as many times as required. If the print data has a time-of-day of printing later than "9:00, Oct. 4, 2005", the image forming data is not printed.

In the fourth embodiment, the permit information is a single item of information. Instead, the permit information may be a combination of a plurality of items of information including, for example, a password.

Steps S457-S459 may be carried out after step S454, in which case, if YES at S458, then the program proceeds to step S459: if NO at step S458, then the program proceeds to step S455. Further, if YES at S459, then the program proceeds to step S455: if NO, then printing is performed.

As described above, if the user is desperate to print immediately, a user may be allowed to print even though the user has been under print restriction. Further, the image forming system of the fourth embodiment is capable of setting available amount of time for printing after performing a printing operation in the TEMPORARY PERMIT MODE".

Instead of restricting the available amount of time for printing after a printing operation is performed in the "TEMPORARY PERMIT MODE", the time interval between consecutive printing operations may be restricted.

Fifth Embodiment

Figure 20:
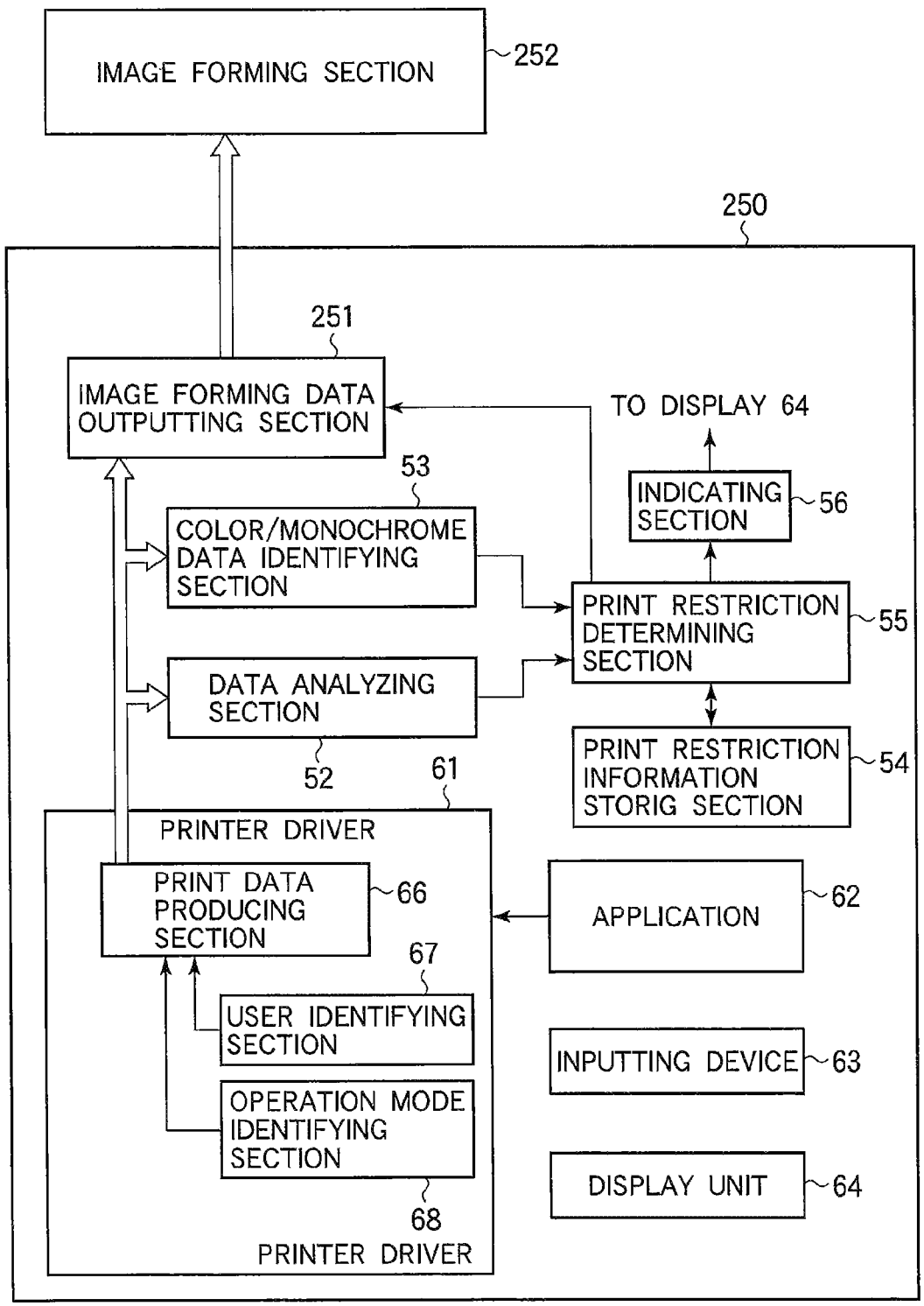
FIG. 20 is a block diagram illustrating an information processing apparatus of a fifth embodiment.

FIG. 20 is a block diagram illustrating an information processing apparatus 250 of a fifth embodiment.

The information processing apparatus 250 includes all the sections in the client 13 of the image forming system 10 and the following additional sections: a data analyzing section 52, a color/monochrome data identifying section 53, a print restriction determining section 55, and a notifying section 56.

In the image forming system 10 of the first embodiment, the image forming section 58 performs printing in response to a print instruction received from the print restriction determining section 55. In contrast, an image forming data outputting section 251 of the image processing apparatus 250 outputs image forming data in response to a print instruction received from the print restriction determining section 55. The image processing apparatus 250 outputs the image forming data to the image processing section 252, which in turn performs printing unconditionally. The remaining operation is exactly the same as the image forming system 10 of the first embodiment, and their description is omitted.

The image processing apparatus 250 implements the tasks of sections other than the image forming section 58 in the image forming system of the first embodiment.

Just as in the printer 71 of the second embodiment (FIG. 7), a number-of-print permits determining section 73 of the second embodiment may be added to the image processing apparatus 250 so that the image processing apparatus 250 may operate in the same way as in the second embodiment.

Just as in the image forming system 110 (FIG. 10) of the third embodiment, the number-of-print permits determining section 73, the document title identifying section 116, document title identifying section 118 may be added to the image processing apparatus 250 so that the image processing apparatus 250 may operate in the same way as in the third embodiment.

Just as in the image forming system 210 (FIG. 15) of the fourth embodiment, time identifying section 216, and the print time identifying section 218 may be added to the image processing apparatus 250 so that the image processing apparatus 250 may operate in the same way as in the fourth embodiment.

The present invention may be applicable to not only printers but also to copying machines, FAXes, and multifunction apparatus.

Sixth Embodiment

FIG. 21 is a block diagram illustrating a configuration of a sixth embodiment. Referring to FIG. 21, a printing system 500 includes an administrator terminal 100, an administration database server 200, a user information database server 300, user terminal 400, and network 900.

The administrator terminal 100 takes the form of a personal computer (PC) connected to the network 900. The administrator terminal 100 includes an operation section 101, a registration section 102, a transmitter 103, and a network interface 104. An administrator sends cancellation information to the administration database server 200 over the network 900.

The operation section 101 includes keyboard switches and a display device from which the administrator inputs various data such as user name, group name to which the user belongs, attribute of document, expiration date, print restriction list, and a quota on pages to print for the user. In other words, the operation section 101 is a man-machine interface for the administrator to communicate with the administrator terminal 100.

The registration section 102 is a section in which the administrator terminal 100 performs computer-based functions. A CPU, not shown, reads a control program stored from a ROM, not shown, and executes the program to display a predetermined screen on the operation section 101 and to produce a registration request, based on various items of data received through the operation section 101.

The transmitter 103 receives the registration request from the registration section 102, produces a registration requesting signal in the form of a packet, and sends the registration requesting signal to the network interface 104.

The network interface 104 is a network interface between the administrator terminal 100 and the network 900. The network interface 104 receives the registration requesting signal from the transmitter 103, and sends the registration requesting signal to the network 900.

The administration database server 200 includes a network interface 211, a cancellation encoding section 212, a cancellation code processing section 213, an administration database 214, and a cancellation code obtaining section 215. The administration database server 200 is a server that encodes the registration request to produce a cancellation code, and register the cancellation code therein. Upon a request from the user terminal 400, the administration database server 200 sends a cancellation code signal to the user terminal 400.

The network interface 211 is a network interface that connects the administration database server 200 and the network 900. In accordance with a predetermined protocol, the network interface 211 receives the registration requesting signal and a cancellation code requesting signal, and sends a cancellation code signal to the network 900.

The cancellation encoding section 212 encodes the content of the registration request in the registration requesting signal received from the network interface 211, thereby producing the cancellation code.

The cancellation code processing section 213 is a computer-based function performed in the administration database server 200. Specifically, a CPU, not shown, reads a control program from a ROM, not shown, and executes the program to implement the function in which the cancellation encoding section 212 encodes the content of the registration request and produces the cancellation code, and a function in which the cancellation code processing section 213 registers the cancellation code with the administration database 214 and manages the registered cancellation code.

The administration database 214 receives the cancellation code from the cancellation code processing section 213, and stores the cancellation code therein. FIGS. 22A and 22B illustrate data registered with the administration database 214. For example, FIG. 22A illustrates cancellation information including user name, group name to which the user belongs, attribute of document, expiration data of document, print restriction list, and quota on pages to print for the user. The cancellation information is input via the network interface 211. Then, the cancellation encoding section 212 produces the cancellation code based on the cancellation information. By using lossless data compression, each item of the cancellation information coded in ASCII is converted into a series of bytes, which is the cancellation code. The thus obtained cancellation code and the user name and group name are combined into a data structure in FIG. 22B, which is stored in the administration database 214.

Referring back to FIG. 21, the cancellation code obtaining section 215 is a computer-based functions performed in the administration database server 200. Specifically, a CPU, not shown, reads a control program stored from a ROM, not shown, and executes the program to produce a cancellation code signal based on the various data received from the administrator. In other words, the cancellation code obtaining section 215 receives the cancellation code requesting signal from the user terminal 400 through the network 900 and network interface 211, and then reads a cancellation code from the administration database 214. The cancellation code obtaining section 215 then sends the cancellation code as a cancellation code signal to the user terminal 400.

The user information database server 300 includes a network interface 321, a user information obtaining section 322, a user information database 323, a decoding section 324, and a code inputting section 325. The user information database server 300 stores the user restriction information. The user information database server 300 produces restriction cancellation information for each user based on a cancellation request received from the cancellation code inputting section 433 of the user terminal 400, the cancellation request indicating that the user requests cancellation of restriction. The restriction cancellation information includes information on specific print restrictions placed on individual users and information on cancellation of the specific print restrictions.

The network interface 321 is an interface located between the user information database server 300 and the network 900. The network interface 321 receives a cancellation request and a print request from the network 900. Also, the network interface 321 sends a cancellation signal to the network 900. The decoding section 324 decodes the content of the cancellation request received from the network interface 321 to produce restriction cancellation information.

The code inputting section 325 is a computer-based function performed in the user information database server 300. Specifically, a CPU, not shown, reads a control program stored from a ROM, not shown, and executes the control program in which the decoding section 324 encodes the cancellation request to produce the restriction cancellation information. The code inputting section 325 registers the restriction cancellation information with the user information database 323, and manages the registered restriction cancellation information.

The user information database 323 is a database (i.e., memory) that receives the restriction cancellation information from the code inputting section 325 and stores the restriction cancellation information and its history record.

FIG. 23 illustrates an example of the restriction cancellation information in the user information database 323. Referring to FIG. 23, the restriction cancellation information includes a user name, group name to which the user belongs, print restriction list, a valid cancellation code list, an invalid cancellation code list, which have been decoded and still held in corresponding memory areas. The invalid cancellation code list is a list of the cancellation codes that were inputted in the past and are now invalid.

Referring back to FIG. 21, upon receiving the print request from the user terminal 400 via the network 900 and the network interface 321, the user information obtaining section 322 reads the restriction cancellation information from the user information database 323 and sends the restriction cancellation information as a cancellation signal to the user terminal 400. The user information obtaining section 322 is a computer-based function performed in the user information database server 300. Specifically, a CPU, not shown, reads a control program stored from a ROM, not shown, and executes the control program to implement the function in which the user information database 323 is produced.

The user terminal 400 includes a network interface 431, a cancellation code obtaining section 432, a cancellation code inputting section 433, a print setting processing section 420, and a printer driver 430. The user terminal 400 sets print settings in response to a print command based on the restriction cancellation information for each user, and produces print data based on the print settings before outputting the print data to a print engine, not shown.

The network interface 431 is a network interface that connects the user terminal 400 to the network 900. The network interface 431 receives the cancellation signal and cancellation code signal from the network 900, and sends a print request and a cancellation request to the network 900.

In response to a request from the user input from an operating means, not shown, the cancellation code obtaining section 432 sends a cancellation code requesting signal that specifies the user name and the group name to which the user belongs, to the administration database server 200 via the network interface 431 and the network 900, thereby obtaining the cancellation code associated with the user. The cancellation code corresponds to the cancellation code requesting signal. The cancellation code obtaining section 432 is a computer-based function performed in the user terminal 400. Specifically, a CPU, not shown, reads a control program stored from a ROM, not shown, and executes the program to implement the function.

In accordance with the user's choice, the cancellation code inputting section 433 receives a cancellation code that the user requests the user information database server 300 to store, the cancellation code being selected from among the cancellation codes associated with users which the cancellation code obtaining section 432 obtained. The cancellation code inputting section 433 is a computer-based function performed in the user terminal 400. Specifically, a CPU, not shown, reads a control program stored from a ROM, not shown, and executes the program to implement the function.

A print commanding section 434 monitors print commands that are received from a host apparatus, not shown, or users via the operating means. Upon detecting a print command, the print commanding section 434 identifies the user name and the attribute of document, produces a print request, and sends the print request to a controller 435.

A print setting processing section 420 includes the controller 435, a code selecting section 436, and a number-of-copies inputting section 437. In accordance with the restriction cancellation information under management of the user information database server 300, the print setting processing section 420 sets a print setting in response to the print request received from the print commanding section 434. This print setting is a print setting that has been previously assigned to the user.

Upon receiving the print request from the print commanding section 434, the controller 435 obtains the restriction cancellation information from the user information database server 300 via the network 900 and the network interface 431 in accordance with the user name contained in the print request. Then, the controller 435 prompts the user to make selection and decision via the code selecting section 436 and the number-of-copies inputting section 437, and produces a print setting in accordance with the user's selection and decision. Then, the controller 435 sends the print setting to print settings specifying section 441, and updates the content of the user information database 323.

The code selecting section 436 displays the restriction cancellation information, which was obtained by the controller 435, on a display means, not shown, so that the user can select a cancellation code specified by the print request.

The number-of-copies inputting section 437 displays the restriction cancellation information, which was obtained by the controller 435, on a display means, not shown, prompting the user to select the number of pages that requires cancellation of restriction code specified by the print request.

The printer driver 430 includes a print settings specifying section 441, a document receiving section 442, a rendering section 443, and an image outputting section 444. Under control of the print setting processing section 420, the printer driver 430 outputs print data to the print engine through the document receiving section 442.

The document receiving section 442 receives a document to be printed from the host apparatus. Under the control of the controller 435, the print settings specifying section 441 provides the printing setting for the document to be printed to the rendering section 443. In accordance with the print settings received from the print settings specifying section 441, the rendering section 443 converts the document into an image (i.e., print data) that can be printed by the print engine.

The operation of the printing system 500 will be described in terms of (1) cancellation code registering processing activated by the system administrator registers, (2) cancellation code obtaining processing activated by the user, (3) cancellation code inputting process activated by the user, and (4) printing.

Figure 24A:
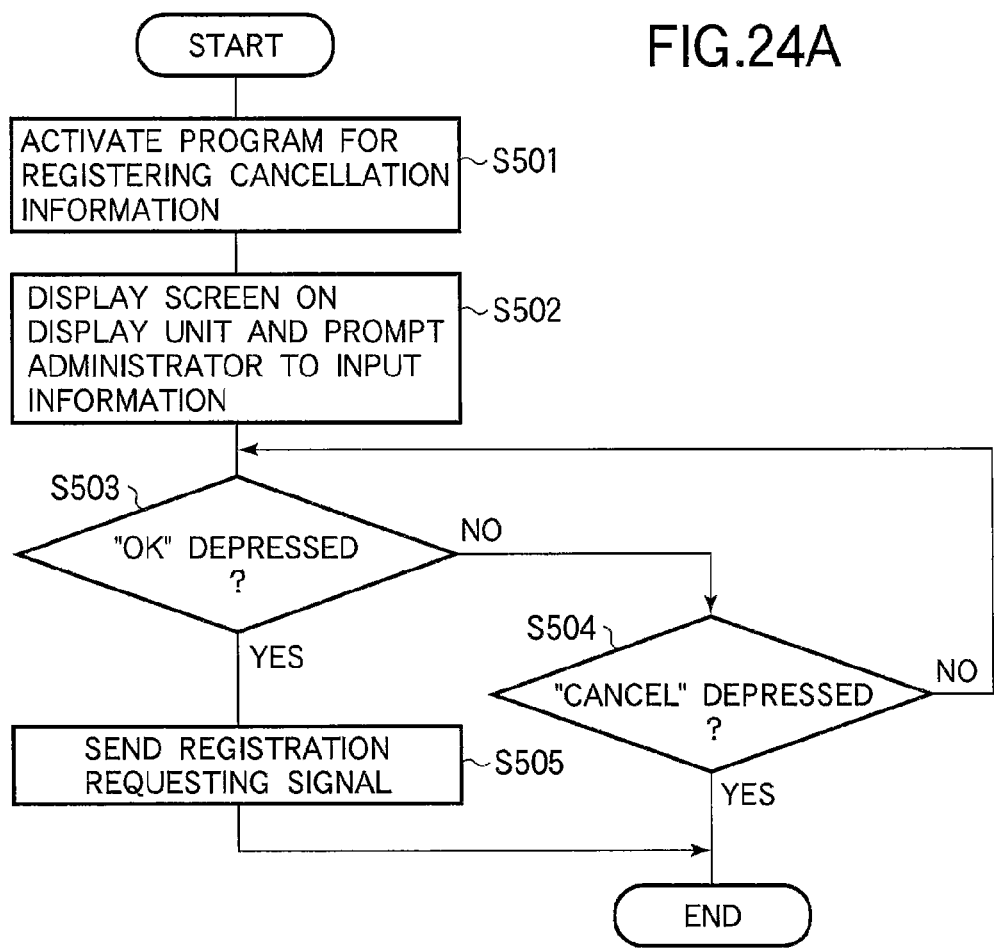
FIG. 24A is a flowchart illustrating a cancellation code registering processing.
Figure 24B:
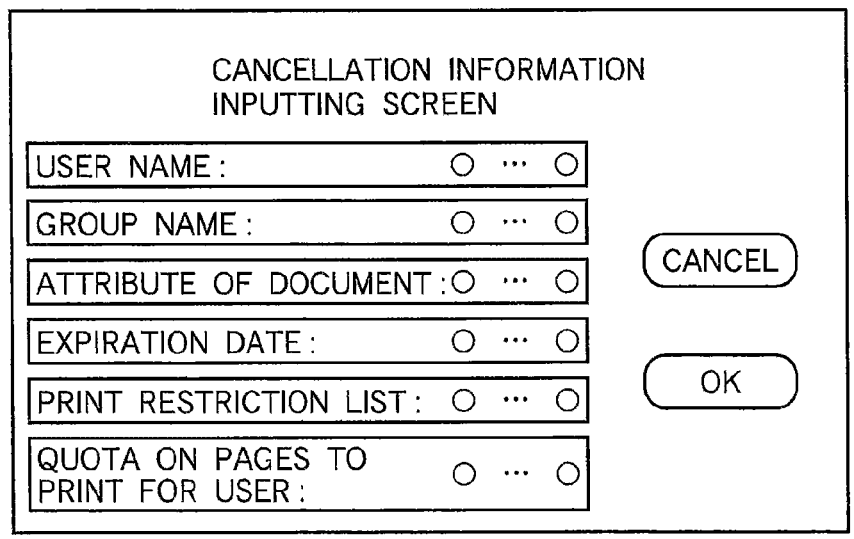
FIG. 24B illustrates an example of a cancellation information inputting screen.

FIG. 24A is a flowchart illustrating the cancellation code registering processing. FIG. 24B illustrates an example of a cancellation information inputting screen.

The flowchart in FIG. 24A illustrates the operation in which the system administrator registers a cancellation code with the administration database server 200 from the administrator terminal 100.

Step S501

When the system administrator depresses a predetermined key on the operation section 101, a CPU activates a program for registering cancellation information so that the registration section 102 begins to operate.

Step S502

The registration section 102 displays the screen in FIG. 24B on the display unit of the operation section 101, prompting the system administrator to input predetermined information including the user name (e.g., SMITH), the group name to which the user belongs (e.g., department of soft ware), the attribute of document (e.g., WORD), the expiration date (e.g., 2005/12/31), print restriction list (e.g., color, n-up), and quota on pages to print for the user (e.g., 20 pages).

Step S503

If the system administrator clicks on a button "OK" after having inputted the necessary information, the program proceeds to step S505. If the button "OK" is not pressed, the program proceeds to step S504.

Step S504

If the system administrator clicks a button "CANCEL", the program ends. If the answer is NO, then the program returns to step S503.

Step S505

The transmitter 103 converts the information inputted by the system administrator into the registration requesting signal in the form of a packet, and sends the thus produced signal to the network interface 104 and then to the administration database server 200 via the network 900. The cancellation encoding section 212 encodes the content of the registration requesting signal into a cancellation code, for example, in the form of "cancellation code XXXYYYZZZ: user name=John Smith; group name=department of soft ware; attribute of document=WORD, expiration date of document=2005/12/31; print restriction list=color, n-up; and the number of pages permitted to print=20 pages". The cancellation code processing section 213 stores this cancellation code into the administration database 214.

FIG. 25A is a flowchart illustrating the cancellation code obtaining processing. FIG. 25B illustrates an example of a cancellation information inputting screen.

The flowchart in FIG. 25A illustrates the operation in which the user obtains all the cancellation codes associated with the user from the administration database server 200 and selects his desired cancellation code from among the cancellation codes.

Step S511

When the user depresses a predetermined key on the user terminal 400, a CPU activates a program for requesting to obtain a cancellation code so that the cancellation code obtaining section 432 begins to operate.

Step S512

The cancellation code obtaining section 432 displays the screen in FIG. 25B on the display unit of the operation section 101, prompting the user to input predetermined information including the user name (e.g., SMITH) and the group name to which the user belongs (e.g., department of soft ware).

Step S513

When the user clicks on the button "OK" after inputting the user name and the group name to which the user belongs, the cancellation code obtaining section 432 sends the cancellation code requesting signal to the administration database server 200 via the network interface 31 and the network 900.

Step S514

The cancellation code obtaining section 215 receives the cancellation code requesting signal via the network interface 31 and the network 900.

Step S515

Based on the content of the cancellation code requesting signal, the cancellation code obtaining section 215 searches the cancellation codes registered in the administration database 214 to determine whether the administration database 214 has the cancellation code that coincides the content of the cancellation code requesting signal in FIG. 25B. If YES, the program proceeds to step S516; if NO, the program proceeds to step S517. Here, assume that the following cancellation code has been registered.

"cancellation code XXXYYYZZZ: user name=John Smith; group name=department of soft ware; attribute of document=WORD, expiration date of document=2005/12/31; print restriction list=color, n-up; and the number of pages permitted to print=20 pages".

Step S516

The cancellation code obtaining section 215 reads all the cancellation codes that coincide with that in the cancellation code requesting signal from the administration database 214. Then, the cancellation code obtaining section 215 produces a cancellation code signal in the form of a packet, and sends the cancellation code signal to the cancellation code obtaining section 432 through the network interface 211 and over the network 900.

Step S517

The cancellation code obtaining section 215 produces an invalidity notification and sends the invalidity notification to the network interface 31 through the network interface 211 and over the network 900.

Step S518

The cancellation code obtaining section 432 receives the cancellation code signal or the invalidity notification over the network 900 and through the network interface 31.

Step S519

The cancellation code obtaining section 432 displays the content of the cancellation code signal or invalidity notification on a display unit of an operating means, not shown. Here, "cancellation code XXXYYYZZZ" appears on the display unit.

Figure 26A:
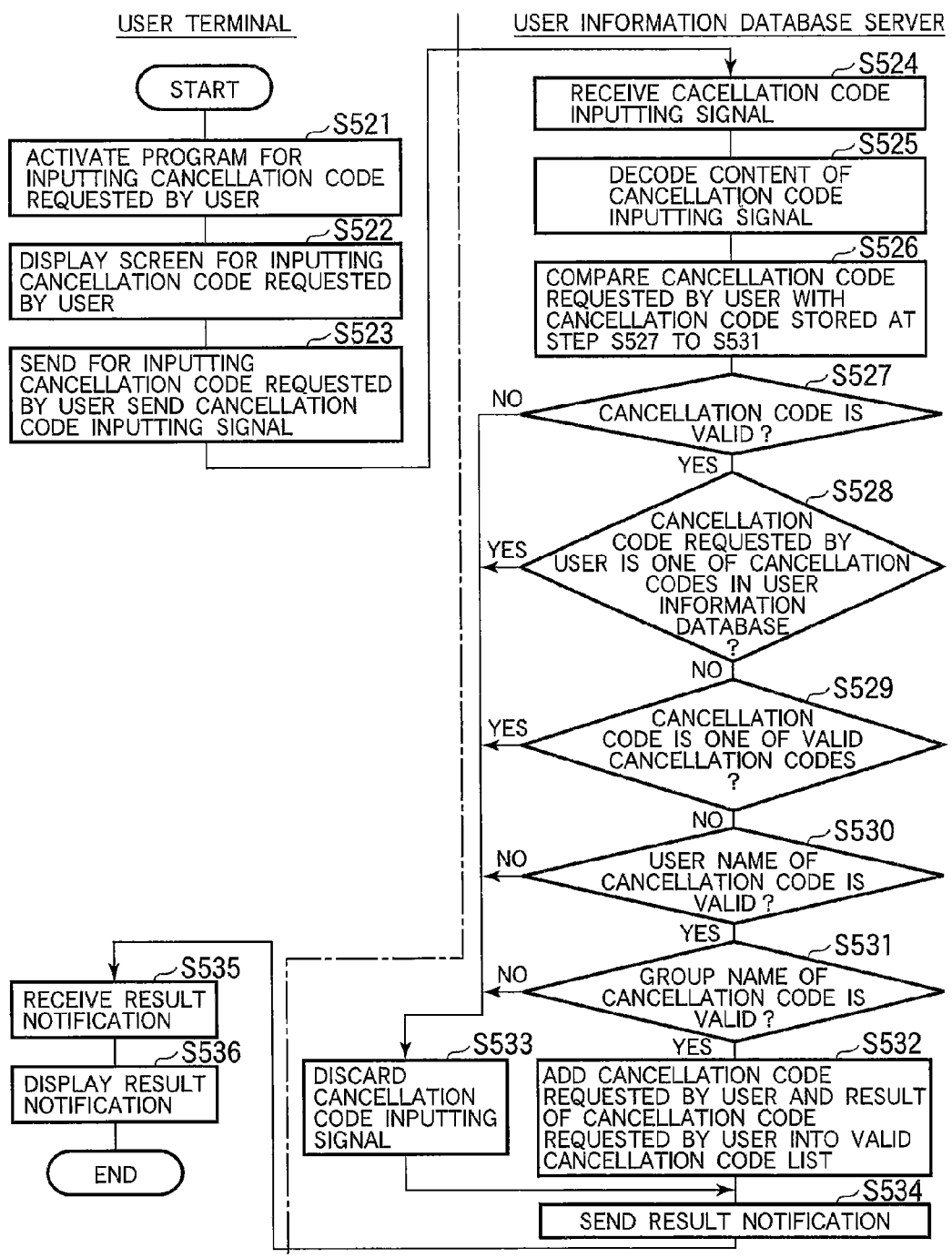
FIG. 26A is a flowchart illustrating a cancellation code inputting processing performed by the user.
Figure 26B:
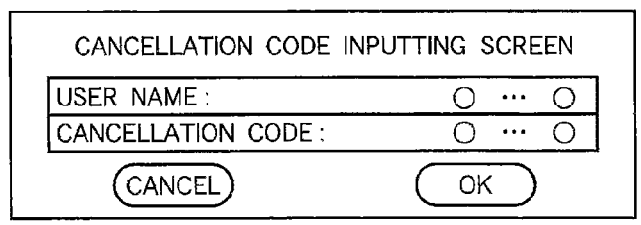
FIG. 26B illustrates an example of a cancellation code inputting screen.

FIG. 26A is a flowchart illustrating the cancellation code inputting process performed by the user. FIG. 26B illustrates an example of a cancellation code inputting screen. This screen is a screen via which the user inputs a request for cancellation of restriction.

The flowchart in FIG. 26A illustrates the operation in which the user selects the only necessary one (s) of all the cancellation codes associated with the user from the administration database 214, and inputs the selected ones) as a cancellation code issued by the user into the user information database 323.

Step S521

When the user depresses a predetermined key on the user terminal 400, a CPU, not shown, activates a program for inputting cancellation code requested by the user so that the cancellation code inputting section 433 begins to operate.

Step S522

The cancellation code inputting section 433 displays the screen in FIG. 26B on the display unit of the operation section 101, prompting the user to input the user name and the cancellation code.

Step S523

When the user clicks on the button "OK" in the screen, after inputting the necessary information, e.g., the user name and "cancellation code XXXYYYZZZ", the cancellation code inputting section 433 sends a cancellation code inputting signal to the administration database server 200 through the network interface 31 and over the network 900.

Step S524

The code inputting section 325 receives the cancellation code inputting signal over the network 900 and through the network interface 211.

Step S525

The decoding section 324 begins to decode the content of the cancellation code inputting signal.

Step S526

Using the information (user name and cancellation code, the code inputting section 325 compares the content of the cancellation code issued by the user with the content of the cancellation code stored in the user information database 323 at steps S527 to S531.

Assume that the cancellation code issued by the user is "cancellation code XXXYYYZZZ: user name=John Smith; group name=department of soft ware; attribute of document=WORD, expiration date of document=2005/12/31; print restriction list=color, n-up; and the number of pages permitted to print=20 pages", and the user information database 323 stores the valid cancellation code list, e.g., "cancellation code AAABBBCCC: user name=John Smith; group=department of soft ware; attribute of document=pdf, expiration date of document=2005/11/01; print restriction list=color, duplex printing; and the number of pages permitted to print=15 pages". Also assume that the user information database 323 stores "cancellation code MMMNNNOOO" and "cancellation code PPPQQQRRR" that have been previously stored.

Step S527

The code inputting section 325 checks whether the content of the cancellation code is before the expiration date. If YES, the program proceeds to step S528 and if NO, the program proceeds to step S533.

Step S528

The code inputting section 325 checks whether the content of the cancellation code issued by the user is one of the "cancellation codes that have been previously stored in the user information database 323. If NO, the program proceeds to step S529 and if YES, the program proceeds to step S533.

Step S529

The code inputting section 325 checks whether the content of the cancellation code is one of the valid cancellation codes. If NO, the program proceeds to step S530 and if YES, the program proceeds to step S533.

Step S530

The code inputting section 325 checks whether the user name of the cancellation code is valid. If YES, the program proceeds to step S531 and if NO, the program proceeds to step S533.

Step S531

The code inputting section 325 checks whether the group name of the cancellation code is valid. If NO, the program proceeds to step S532 and if YES, the program proceeds to step S533.

Step S532

The code inputting section 325 adds the cancellation code inputted by the user (cancellation code requested by the user and the information obtained from the results obtained by decoding the cancellation code inputted by the user, into the valid cancellation code list. Here, the valid cancellation code is, for example, "cancellation code XXXYYYZZZ: user name=John Smith; group name=department of soft ware; attribute of document=WORD, expiration date of document=2005/12/31; print restriction list=color, n-up; and the number of pages permitted to print=20 pages". In other words, this valid cancellation code is added to the valid cancellation code list in addition to the "cancellation code AAABBBCCC: user name=John Smith; group name=department of soft ware; attribute of document=pdf, expiration date of document=2005/11/01; print restriction list=color, duplex; and the number of pages permitted to print=15 pages".

Step S533

The code inputting section 325 discards the cancellation code. For example, if the cancellation code is "cancellation code XXXYYYZZZ: user name=Betty Smith; group name=department of soft ware; attribute of document=WORD, expiration date of document=2005/12/31; print restriction list=color, n-up; and the number of pages permitted to print=20 pages", the user name is not coincident. Thus, the cancellation code is discarded.

Step S534

The code inputting section 325 sends a result notification which indicates the result of step S533 or step S532 to the user terminal 400 through the network interface 321 and over the network 900.

Step S535

The cancellation code inputting section 433 receives the result notification which indicates the results of step S533 or step S532 through the network interface 431 and over the network 900.

Step S536

The cancellation code inputting section 433 displays the content of the result notification on the display unit, thereby indicating the result to the user.

Figure 28:
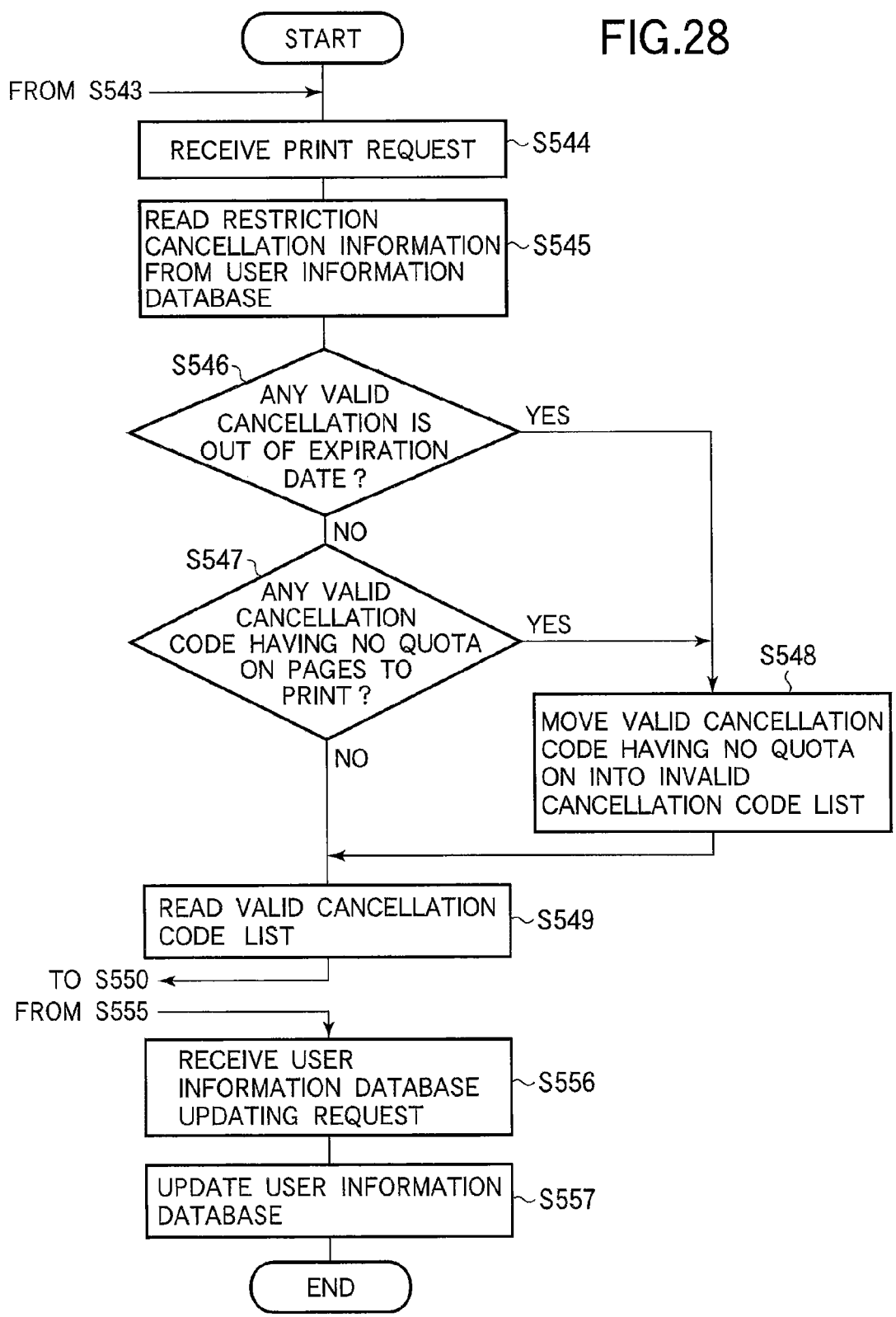
FIG. 28 is an additional portion of the flowchart of FIG. 27.

FIG. 27 is an initial portion of a flowchart illustrating the printing operation. FIG. 28 is an additional portion of the flowchart of FIG. 27.

FIG. 27 illustrates the operation of the user terminal 400 and FIG. 28 illustrates the operation of the user information database server 300.

Step S541

The print commanding section 434 detects a print command from the user or a host apparatus, not shown.

Step S542

Upon detecting the print command, the print commanding section 434 produces a print request that identifies the user name and the attribute of document, and sends the print request to the controller 435. Here, assume that print request identifies the user name=John Smith and attribute of document=WORD).

Step S543

The controller 435 sends the print request to the user information database server 300 through the network interface 431 and over the network 900.

Step S544

The user information obtaining section 322 of the user information database server 300 receives the print request over the network 900 and through the network interface 321.

Step S545

Using the user name and attribute of document that are identified by the print request, the user information obtaining section 322 reads the restriction cancellation information from the user information database 323). Here, the restriction cancellation information is read using the user name=John Smith and attribute of document=WORD.

Step S546

The user information obtaining section 322 checks the restriction cancellation information read from the user information database 323 to determine whether a valid cancellation code out of the expiration date exists. If YES, the program proceeds to step S548; if NO, the program proceeds to step S547.

Step S547

The user information obtaining section 322 makes a decision to determine whether a valid cancellation code having no quota on pages to print for the user exists in the restriction cancellation information. If YES, the program proceeds to step S548; if NO, the program proceeds to step S549.

Step S548

The user information obtaining section 322 moves the valid cancellation code having no quota on pages for the user into the invalid cancellation code list.

Step S549

The user information obtaining section 322 reads the content of the valid cancellation code list (FIG. 23) and produces the cancellation signal. Then, the user information obtaining section 322 sends the cancellation signal to the controller 435 of the user terminal 400 through the network interface 321 and over the network 900. For example, the user information obtaining section 322 reads "cancellation code XXXYYYZZZ: user name=John Smith; group name=department of soft ware; attribute of document=WORD, expiration date of document=2005/12/31; print restriction list=color, n-up; and the number of pages permitted to print=20 pages" is, the user name is not coincident. Thus, the cancellation signal is produced based on this cancellation code XXXYYYZZZ.

Step S550

The controller 435 receives the valid cancellation code list over the network 900 and through the network interface 31.

Step S551

The code selecting section 436 displays the list of the cancellation signals that the controller 435 received on a display means, not shown, prompting the user to select a cancellation code that needs to be cancelled in accordance with the current print request. If the user makes a selection, the program proceeds to step S552; if the user does not make a selection, the program proceeds to step S558.

Step S552

The code selecting section 436 makes a decision to determine whether the selected cancellation code is appropriate for the document to be printed. If YES, then the program proceeds to step S553; if NO, the program returns to step S551.

Step S553

The number-of-copies inputting section 437 displays the content of the restriction cancellation information that the controller 435 obtained on a display means, not shown, prompting the user to input the necessary number of pages for which cancellation of restriction should be cancelled in accordance with the current print request. Here, assume that the user inputs "8 pages".

Step S554

The number-of-copies inputting section 437 makes a decision to determine whether the number of pages inputted is larger than the quota on pages for the user. If NO, the program returns to step S553; if YES, the program proceeds to step S555.

Step S555

The controller 435 produces a user information database updating request by subtracting the inputted number of pages from the quota on pages for the user. In other words, the user information database updating request indicates a remaining number of pages that the user is allowed to print. The controller 435 sends the user information database updating request to the user information obtaining section 322 through the network interface 31 and over the network 900. Then, the program proceeds to step S560. Here, the difference between the quota on pages for the user and the number of pages inputted is 20−8=12.

Step S556

The user information obtaining section 322 receives the user information database updating request over the network 900 and through the network interface 321.

Step S557

The user information obtaining section 322 updates the user information database 323 with the content of the user information database updating request, and completes the flow on the user information database server 300 side. Here, assume that "cancellation code XXXYYYZZZ: user name=John Smith; group name=department of soft ware; attribute of document=WORD, expiration date of document=2005/12/31; print restriction list=color, n-up; and the quota on pages for the user=20 pages" is updated to "cancellation code XXXYYYZZZ: user name=John Smith; group name=department of soft ware; attribute of document=WORD, expiration date of document=2005/12/31; print restriction list=color, n-up; and the quota on pages for the user=12 pages".

Step S558

The controller 435 discards the received valid cancellation code list.

Step S559

The controller 435 selects the specified print setting.

Step S560

The controller 435 notifies the printer driver 430 of the selected print setting.

Step S561

Printing is performed.

As described above, the printing system of the sixth embodiment includes the administration database server 200, the user information database server 300, and the print setting processing section 420. Despite the fact that users are individually forced to limited a print setting, the print restriction may be cancelled temporarily if certain conditions are met. Thus, the sixth embodiment offers a more flexible print environment to the users.

Seventh Embodiment

In the sixth embodiment, only the administrator is allowed to register a cancellation code with an administration database server 700. In a seventh embodiment, an assistant administrator is also allowed to register the cancellation code with the administration database server 700. Therefore, a printing system 1000 of the seventh embodiment is configured such that the assistant administrator is also allowed to register the cancellation code with the administration database server 700.

Figure 29:
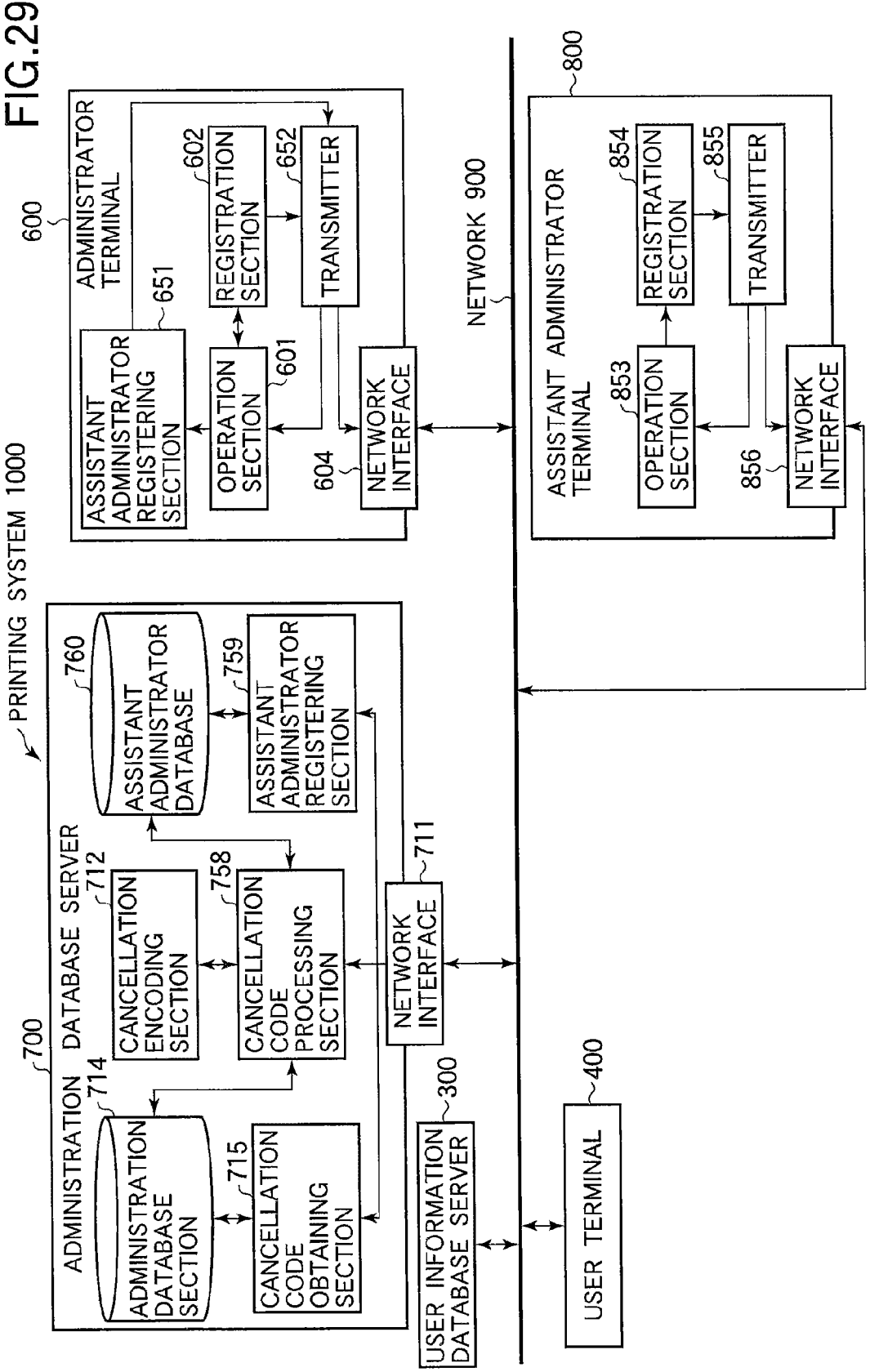
FIG. 29 is a block diagram illustrating the printing system of a seventh embodiment.

FIG. 29 is a block diagram illustrating the printing system of the seventh embodiment.

Referring to FIG. 29, the printing system 1000 includes a administrator terminal 600, a administration database server 700, a user information database server 300, user terminal 400, network 900, and an assistant administrator terminal 800. Elements similar to those of the sixth embodiment have been given the same reference numerals and their description is omitted.

The administrator terminal 600 includes an operation section 101, a registration section 602, an assistant administrator registering section 651, a transmitter 652, and a network interface 604. The administrator sends cancellation information to an administration database server 700 over the network 900. The assistant administrator is allowed to register the cancellation code from one of the personal computers connected to the network 900.

The assistant administrator registering section 651 registers the assistant administrator with the administration database server 700, so that not only the administrator but also the assistant administrator may register cancellation codes with the administration database server 700. The assistant administrator registering section 651 is a computer-based function performed in the administrator terminal 600. Specifically, a CPU, not shown, reads a control program stored from a ROM, not shown, and executes the program to implement the function.

The transmitter 652 receives a registration request from the registration section 102, and produces a registration requesting signal in the form of a packet. The transmitter 652 then sends a registration requesting signal to the network interface 604. The transmitter 652 also receives an assistant administrator registration request from the assistant administrator registering section 651, produces an assistant administrator registration requesting signal, and sends the assistant administrator registration requesting signal to the network interface 604.

The administration database server 700 includes a network interface 711, a cancellation code processing section 658, an administration database 714, a cancellation code obtaining section 715, an assistant administrator registering section 759, and an assistant administrator database 760. The administration database server 700 produces a cancellation code by encoding a request for cancellation of restriction, which is issued by the administrator or assistant administrator, into a cancellation code. The thus encoded cancellation code is registered with the administration database 714. An assistant administrator who was requested by the administrator is registered with the assistant administrator database 760. The administration database server 700 also sends a cancellation code signal to the user terminal 400 in response to a request from the user terminal 400.

The cancellation code processing section 758 is a section in which the administration database server 700 performs computer-based functions. Specifically, a CPU, not shown, reads a control program stored from a ROM, not shown, and executes the program to implement the computer-based functions. Specifically, a cancellation encoding section 712 encodes the content of the registration request to produce the cancellation code, registers the thus produced cancellation code with the administration database 714, and manages the registered cancellation code. The seventh embodiment has a function of determining whether the registration request is issued by the administrator or the assistant administrator.

The assistant administrator registering section 759 is a section in which assistant administrator information is registered with an assistant administrator database 760 in accordance with the content of an assistant administrator registration requesting signal.

The assistant administrator database 760 is a database (i.e., memory) that stores the assistant administrator information received from the assistant administrator registering section 759. The assistant administrator information includes, for example, the user name, acceptable group name, and the number of pages that may be permitted to actually print. Here, the user name is the name of the administrator. Acceptable group name is the name of a group whose members are allowed to print.

The assistant administrator terminal 800 includes an operation section 853, a registration section 854, a transmitter 855, and a network interface 856. The assistant administrator sends the cancellation information to the administration database server 700 over the network 900. The assistant administrator terminal 800 is implemented by one of the personal computers connected to the network 900.

The operation section 853 includes keyboard switches and a display device from which the administrator inputs various data such as user name, group name to which the user belongs, attribute of document, expiration date, print restriction list, and the quota on pages for the user. In other words, the operation section 853 is a man-machine interface for the assistant administrator to communicate with the assistant administrator terminal 800.

The registration section 854 is a computer-based function in the assistant administrator terminal 800. Specifically, a CPU, not shown, reads a control program stored from a ROM, not shown, and executes the program to implement the function. Specifically, the registration section 854 displays a predetermined screen on the operation section 853, and produces a registration request based on the various data received from the assistant administrator.

The transmitter 855 receives the registration request from the registration section 854 and produces the registration requesting signal. Then, the transmitter 855 sends the registration requesting signal to the network interface 856.

The network interface 56 is located between the assistant administrator terminal 800 and the network 900, and connects the assistant administrator terminal 800 to the network 900. The network interface 856 receives the registration requesting signal from the transmitter 55, and provides the registration requesting signal to the network 900.

The operation of the printing system 1000 will be described in terms of (1) an assistant administrator information registering processing performed by the system administrator and (2) a cancellation code registering processing performed by the system administrator or assistance administrator.

Figures 30A, 30B:
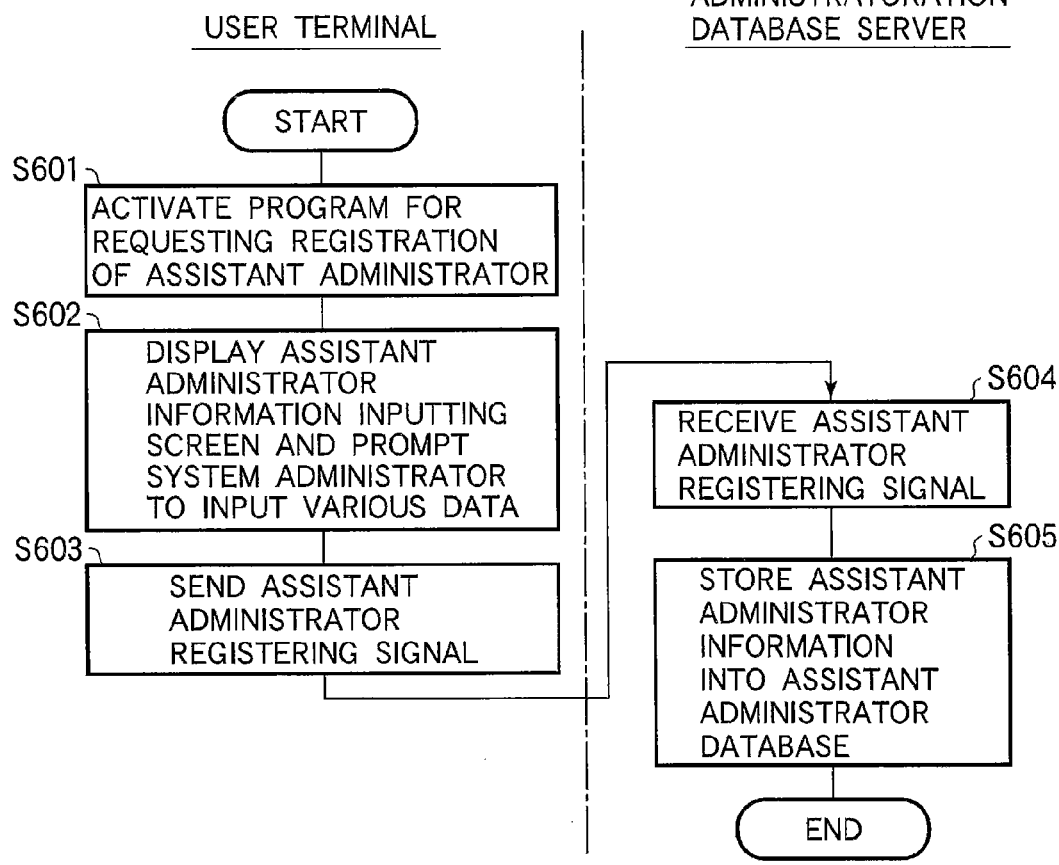
FIG. 30A is a flowchart illustrating an assistant administrator information registering processing.
FIG. 30B illustrates an example of a screen for inputting the assistant administrator information.

FIG. 30A is a flowchart illustrating the assistant administrator information registering processing. The flowchart in FIG. 30A illustrates the operation in which the system administrator registers the assistant administrator information with the administration database server 700. FIG. 30B illustrates an example of a screen for inputting the assistant administrator information, i.e., an assistant administrator information inputting screen.

Step S2-1

When the system administrator depresses a predetermined key on the operation section 101 of the administrator terminal 600, a CPU, not shown, activates a program for requesting registration of assistant administrator information so that the assistant administrator registering section 651 begins to operate.

Step S2-2

The assistant administrator registering section 651 displays an assistant administrator information inputting screen in FIG. 30B on a display unit of the operation section 101, prompting the system administrator to input various data including the user name, acceptable group name, and the number of pages that may be permitted to actually print.

Step S2-3

When the system administrator clicks on a button "OK" on the assistant administrator information inputting screen after having inputted the necessary data, the transmitter 652 receives an assistant administrator registration request from the assistant administrator registering section 651, and produces an assistant administrator registering signal. Then, the transmitter 652 sends the assistant administrator registering signal to the administration database server 700 through the network interface 604 and over the network 900.

Step S2-4

The assistant administrator registering section 759 receives the assistant administrator registering signal over the network 900 and through the network interface 211.

Step S2-5

The assistant administrator registering section 759 stores the assistant administrator information, extracted from the assistant administrator registering signal, into the assistant administrator database 760.

FIG. 31A is an initial portion of a flowchart illustrating the cancellation code registering processing. FIG. 31A is a flowchart illustrating the operation of the administrator terminal 600 or the assistant administrator terminal 800.

FIG. 31B illustrates an example of a cancellation information inputting screen.

FIG. 32 is an additional portion of the flowchart of FIG. 31A illustrating the operation of the administration database server 700.

FIG. 31A and FIG. 32 illustrates the operation in which the system administrator registers a cancellation code with the administration database server 700 from the administrator terminal 600 or the assistant administrator registers a cancellation code with the administration database server 700 from the assistant administrator terminal 800. The operation in which the system administrator registers the cancellation code is essentially the same as that in which the assistant administrator registers the cancellation code. Therefore, a description will be given of the operation in which the system administrator registers the cancellation code. The operation performed by the assistant administrator is described in brackets.

Step S2-11

When the system administrator depresses a predetermined key on the operation section 601 of the administrator terminal 600, a CPU, not shown, activates a program for registering cancellation information so that the registration section 602 begins to operate.

Step S2-12

The registration section 602 (or 854) displays the cancellation information inputting screen in FIG. 31B on a display unit of the operation section 601, prompting the system administrator to input the necessary data including the user name, group name to which the user belongs, attribute of document, expiration date, print restriction list, and the quota on pages for the user.

Step S2-13

If the system administrator clicks on the button "OK" in the screen after having inputted all the information, the program proceeds to step S2-15. If NO, the program proceeds to step S2-14.

Step S2-14

If the system administrator clicks on "CANCEL" in the screen, the program proceeds to step S2-27. If NO, the program returns to step S2-13.

Step S2-15

The transmitter 652 (or 855) converts the information inputted by the system administrator (or assistant administrator) into a registration requesting signal in the form of a packet, and sends the thus produced registration requesting signal to the administration database server 700 through the network interface 604 and then over the network 900.

Step S2-16

The cancellation code processing section 758 receives the registration requesting signal over the network 900 and through the network interface 711.

Step S2-17

The cancellation code processing section 658 detects the source of the registration requesting signal, and makes a decision determine whether the source is the administrator or not. If the source is an administrator, the program proceeds to step S2-18. If the source is not an administrator, the program proceeds to step S2-20.

Step S2-18

The cancellation code processing section 758 controls the cancellation encoding section 712 to encode the content of the registration requesting signal.

Step S2-19

The cancellation code processing section 758 adds the encoded content as a cancellation code, which is a combination with the user name and group name, to the administration database 714.

Step S2-20

The cancellation code processing section 758 consults the assistant administrator database 760 for the user name of the source.

Step S2-21

A decision is made to determine whether the source of the registration requesting signal is the assistant administrator. If YES, the program proceeds to step S2-22. If NO, the program proceeds to step S2-24.

Step S2-22

The cancellation code processing section 758 compares the quota on pages for the user contained in the cancellation information with the number of pages permitted to actually print, stored in the assistant administrator database 760. If YES, then the program proceeds to step S2-23. If NO, the program proceeds to step S2-24.

Step S2-23

The cancellation code processing section 758 compares the group name contained in the cancellation information with the group name stored in the assistant administrator database 760. If they coincide, then the program proceeds to step S2-18. If they don't coincide, the program proceeds to step S2-24.

Step S2-24

The cancellation code processing section 758 discards the registration request, and the program proceeds to step S2-25.

Step S2-25

The cancellation code processing section 758 sends a reply (i.e., acceptance or rejection) to the registration request to the administrator terminal 600 (or assistant administrator terminal 800) through the network interface 711 and over the network 900.

Step S2-26

The transmitter 652 (or 855) receives the result notification (i.e., acceptance or rejection) to the registration request over the network 900 and through the network interface 604 (or network interface 856).

Step S2-27

The transmitter 652 (or 855) displays the result notification on the display unit of the operation section 601.

As described above, an assistant administrator may be assigned, thereby decreasing the burden of the system administrator. The seventh embodiment provides more flexible printing environment to the users.

While the present invention has been described in terms of a printer, the invention may also be applicable to copying machines and multifunction printers.

What is claimed is:

1. An image forming apparatus in which registered users are restricted in the use of the image forming apparatus, comprising:
   a data analyzing section configured
      to receive print data having a data structure containing image data, a user information of a registered user and a temporary permit mode information of the image forming apparatus,
      to detect the user information and the temporary permit mode information from the print data, and
      to determine whether the print data includes the temporary permit mode information for temporarily canceling a print restriction on the use of one of a plurality of printing functions of the image forming apparatus and requesting to print the image data using one of the plurality of printing functions;
   a print restriction information storing section that stores print restriction information indicative of whether the print restriction has been placed on the user for restricting the use of one of the plurality of printing functions;
   a print restriction determining section configured to make a decision based on the print restriction on the use of the one of the plurality of printing functions, the user information, and the temporary permit mode information to determine whether the image data should be printed, wherein the print restriction determining section checks the user information to determine whether restriction has been placed on the user; and
   a printing section that prints the image data,
   wherein only if said print restriction determining section determines that the user is restricted in the use of the one of the plurality of printing functions and said data analyzing section, without prompting the user to input the temporary permit mode information, determines that the print data includes the temporary permit mode, said print restriction determining section determines that the image data should be printed using the one of the plurality of printing functions.

2. The image forming apparatus according to claim 1, wherein the print restriction information storing section is configured to store a print restriction information indicating whether the print restriction has been placed on the user.

3. The image forming apparatus according to claim 2, wherein said data analyzing section identifies a document title for the print data, and said print restriction information storing section stores the identified document title;
   wherein said print restriction determining section does not count up a number of printing operations performed in the temporary permit mode if the document title for the print data is identical to a document title stored in said print restriction information storing section.

4. The image forming apparatus according to claim 1, wherein said print restriction determining section is configured to count a number of printing operations performed in the temporary permit mode, wherein when the number of printing operations reaches a value, said print restriction determining section determines that the print data should not be printed.

5. The image forming apparatus according to claim 1, wherein said data analyzing section determines a time-of-day of printing for the print data, the time-of-day being a time at which the print data is received from a cancellation requesting section;
   said print restriction information storing section stores a reference amount of time and the time-of-day of printing; and
   said print restriction determining section permits a following one of two consecutive printing operations only when the following one of the two consecutive printing operations begins within a reference amount of time from the time-of-day of printing for a preceding one of the two consecutive printing operations.

6. The image forming apparatus according to claim 1, wherein said print restriction determining section further comprises an information section, and wherein said print restriction determining section determines that the print data should not be printed and an informing section informs the user that printing of the print data is not permitted.

7. The image forming apparatus according to claim 1, wherein the one of the plurality of printing functions is a color printing function.

8. A printing system in which users are restricted in use of a printer, the printing system comprising:
   a printing section configured to perform printing in accordance with print data;
   a cancellation requesting section configured to issue a request for cancellation of a print restriction placed on a user, the request being accompanied by an operation mode in which the print data should be printed and information that identifies the user;
   a restriction canceling section configured to make a decision based on the request to determine whether said printing section should print the print data in the operation mode, said restriction canceling section canceling the print restriction if said restriction canceling section determines that said printing section should print the print data in the operation mode, said restriction canceling section comprising:
      a cancellation information managing section configured to encode restriction cancellation information inputted by the user into a first cancellation code and manages the first cancellation code, the restriction cancellation information including information on the print restriction placed on the user, said cancellation information managing section sending the first cancellation code to the user upon a request from the user, and
      a user information database server configured to store a print setting for the user, said user information database server reproducing the restriction cancellation information based on the print setting and the first cancellation code received from the user; and
   wherein said print setting processing section configured to set the print setting when said print setting processing section receives a print command from the user, the print setting being set based on the reproduced restriction cancellation information.

9. The printing system according to claim 8, wherein said user information database server is configured to produce the restriction cancellation information based on the first cancellation code stored in said user information database server, the first cancellation code being specified by the user.

10. The printing system according to claim 8, wherein said print setting-processing section includes a code selecting section configured to prompt the user to select a cancellation code from a list of cancellation codes.

11. The printing system according to claim 8, wherein said print setting-processing section further includes a controller configured to request said user information database server to update the content of said information database server after said printing section has performed printing of the print data.

12. The printing system according to claim 8, wherein said cancellation information managing section is configured to produce a second cancellation code based on restriction cancellation information inputted by an assistant administrator to produce a cancellation code and manage the second cancellation code.

13. The printing system according to claim 8, wherein said cancellation information managing section further includes an assistant administrator registering section with which the assistant administrator is registered and is configured to manage the assistant administrator.

14. A printing system in which users are restricted in use of a printer, the printing system comprising:
   (i) a printing section configured to perform printing in accordance with print data;
   (ii) a cancellation requesting section configured to issue a request for cancellation of a print restriction placed on a user, the request being accompanied by an operation mode in which the print data should be printed and information that identifies the user; and
   (iii) a restriction canceling section configured to make a decision based on the request to determine whether said printing section should print the print data in the operation mode, said restriction canceling section canceling the print restriction if said restriction canceling section determines that said printing section should print the print data in the operation mode, said restriction canceling section comprising:
      (a) a data analyzing section configured to
         identify a name of the user and the state of an operation mode from the print data, the state of the operation mode indicating whether the user requests to perform printing in a temporary permit mode where print restriction on the user is temporarily canceled,
         identify a document title for the print data, and
         determine a time-of-day of printing for the print data, the time-of-day being a time at which the print data is received from said cancellation requesting section,
      (b) a print restriction information storing section configured to
         store print restriction information indicative of whether the print restriction has been placed on the user, store the identified document title, prevent a counting up of the number of printing operations performed in the temporary permit mode if the document title for print data coincides with a document title stored in said print restriction information storing section, and store a reference amount of time and the time-of-day of printing, (c) a print restriction determining section configured to make a decision based on the name of the user information and the state of the operation mode to determine whether said printing section should print the print data and counts a number of printing operations performed in the temporary permit mode, wherein when the number of printing operations reaches a value, said print restriction determining section determines that said printing section should not print the print data, and permit a following one of two consecutive printing operations only when the following one of the two consecutive printing operations begins within a reference amount of time from the time-of-day of printing for a preceding one of the two consecutive printing operations, and wherein if said data analyzing section determines that the state of the operation mode is the temporary permit mode, said print restriction determining section determines that said printing section should print the print data.

* * * * *